United States Patent
Yokoyama et al.

(10) Patent No.: US 11,457,121 B2
(45) Date of Patent: Sep. 27, 2022

(54) READING DEVICE, IMAGE FORMING APPARATUS, AND COLOR MIXTURE PREVENTION METHOD

(71) Applicants: Takuhei Yokoyama, Kanagawa (JP); Masamoto Nakazawa, Kanagawa (JP); Tadaaki Oyama, Kanagawa (JP); Ayumu Hashimoto, Kanagawa (JP)

(72) Inventors: Takuhei Yokoyama, Kanagawa (JP); Masamoto Nakazawa, Kanagawa (JP); Tadaaki Oyama, Kanagawa (JP); Ayumu Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/487,278

(22) Filed: Sep. 28, 2021

(65) Prior Publication Data
US 2022/0141350 A1    May 5, 2022

(30) Foreign Application Priority Data
Oct. 29, 2020    (JP) .............................. JP2020-181785

(51) Int. Cl.
*H04N 1/40*    (2006.01)
*H04N 1/12*    (2006.01)
*H04N 1/00*    (2006.01)
*H04N 1/04*    (2006.01)

(52) U.S. Cl.
CPC ..... *H04N 1/40056* (2013.01); *H04N 1/00013* (2013.01); *H04N 1/00018* (2013.01); *H04N 1/0446* (2013.01); *H04N 1/122* (2013.01)

(58) Field of Classification Search
None
See application file for complete search history.

(56) References Cited

U.S. PATENT DOCUMENTS

| 7,006,705 B2* | 2/2006 | Takayama | H04N 1/4097 |
| | | | 382/275 |
| 7,245,784 B2* | 7/2007 | Takayama | H04N 1/4097 |
| | | | 358/463 |

(Continued)

FOREIGN PATENT DOCUMENTS

| JP | 6-139342 | 5/1994 |
| JP | 2006-237896 | 9/2006 |
| JP | 2019-164126 | 9/2019 |

*Primary Examiner* — Scott A Rogers
(74) *Attorney, Agent, or Firm* — Harness, Dickey & Pierce, P.L.C.

(57) ABSTRACT

A reading device includes a first light source configured to emit light, a second light source configured to emit light in a wavelength of light different from a wavelength of light of the first light source, circuitry configured to instruct the first light source and the second light source to turn on and turn off, a first light-intensity adjuster configured to adjust light intensity of the first light source based on a first light intensity value, a second light-intensity adjuster configured to adjust light intensity of the second light source based on a second light intensity value, a first image sensor configured to receive the light that is emitted from the first light source and is reflected by an object, and a second image sensor configured to receive the light that is emitted from the first light source and the second light source and is reflected by the object.

15 Claims, 22 Drawing Sheets

(56) References Cited

U.S. PATENT DOCUMENTS

| | | | |
|---|---|---|---|
| 7,701,623 B2* | 4/2010 | Shimizu | H04N 1/484 |
| | | | 358/463 |
| 2017/0295298 A1 | 10/2017 | Ozaki et al. | |
| 2018/0146150 A1 | 5/2018 | Shirado et al. | |
| 2019/0294935 A1 | 9/2019 | Iwanami et al. | |
| 2019/0327387 A1 | 10/2019 | Hashimoto et al. | |
| 2020/0053230 A1 | 2/2020 | Nakazawa et al. | |
| 2020/0244837 A1 | 7/2020 | Tsukahara et al. | |
| 2020/0252513 A1 | 8/2020 | Nakada et al. | |
| 2020/0336615 A1 | 10/2020 | Ono et al. | |
| 2021/0014441 A1 | 1/2021 | Ohmiya et al. | |
| 2021/0400159 A1* | 12/2021 | Oyama | H04N 1/00795 |
| 2021/0409566 A1* | 12/2021 | Hashimoto | H04N 1/02885 |
| 2022/0109778 A1* | 4/2022 | Nambara | H04N 1/00013 |

* cited by examiner

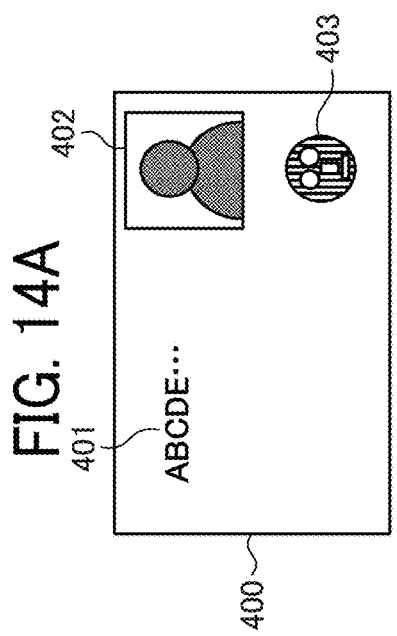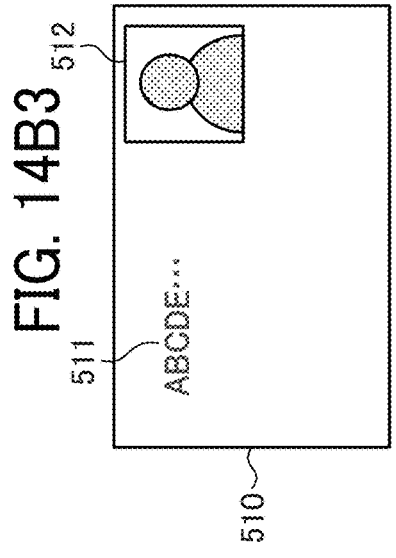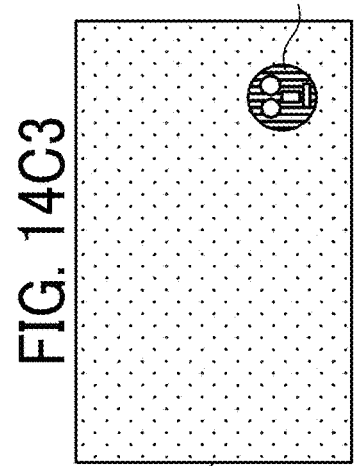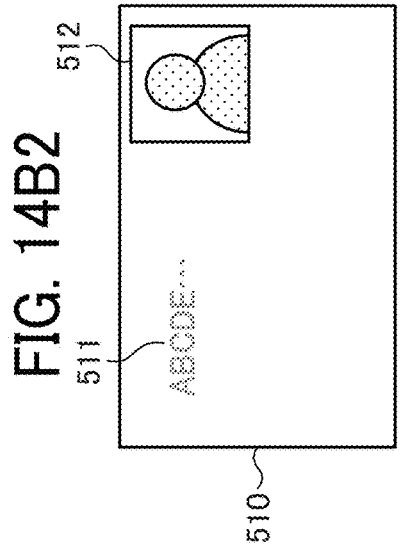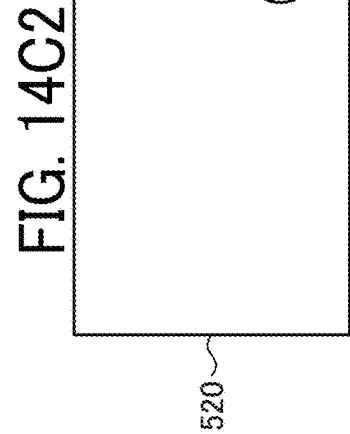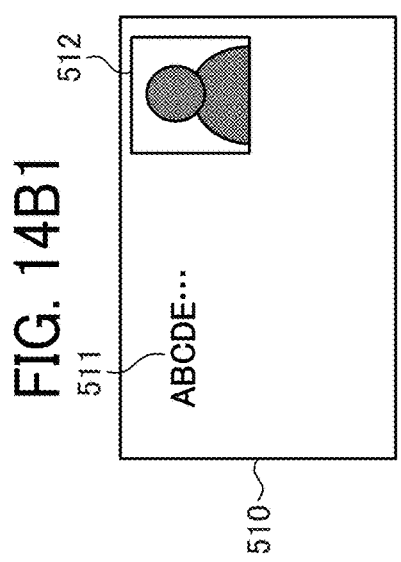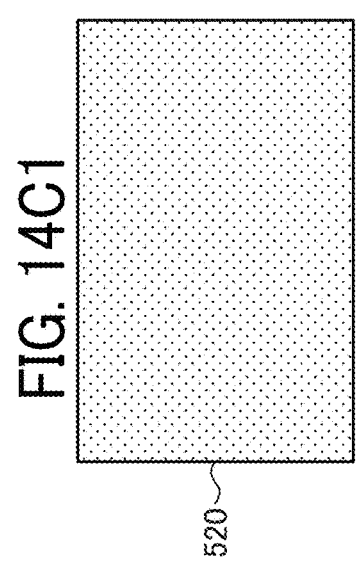

READING DEVICE, IMAGE FORMING APPARATUS, AND COLOR MIXTURE PREVENTION METHOD

CROSS-REFERENCE TO RELATED APPLICATION

This patent application is based on and claims priority pursuant to 35 U.S.C. § 119(a) to Japanese Patent Application No. 2020-181785, filed on Oct. 29, 2020, in the Japan Patent Office, the entire disclosure of which is hereby incorporated by reference herein.

BACKGROUND

Technical Field

Embodiments of the present disclosure relate to a reading device, an image forming apparatus, and a color mixture prevention method.

Background Art

Conventionally, there has been known a technique of an image reading apparatus that simultaneously irradiates a document with visible light and near-infrared light and simultaneously reads an image based on the visible light and an image based on the near-infrared light in one scanning operation. If the document is irradiated with visible light and near-infrared light at the same time, the light in unwanted wavelength from different light sources may be detected when a sensor has sensitivity to such light in unwanted wavelength. In such a case, the light from different light sources may also be superimposed on the image output from the sensor and color mixture may occur. In order to avoid such a situation, technologies are known in the art in which the light intensity is adjusted so as to prevent color mixture from occurring.

For example, technologies are known in the art in which the degree of color mixture of a sensor with respect to each one of the light sources is calculated and the light intensity is adjusted based on the result of calculation in an image reading device that simultaneously turns on a plurality of light sources of different wavelength regions to read an image.

SUMMARY

Embodiments of the present disclosure described herein provide a reading device, an image forming apparatus, and a color mixture prevention method. The reading device includes a first light source configured to emit light, a second light source configured to emit light in a wavelength of light different from a wavelength of light of the first light source, circuitry configured to instruct the first light source and the second light source to turn on and turn off, a first light-intensity adjuster configured to adjust light intensity of the first light source based on a first light intensity value, a second light-intensity adjuster configured to adjust light intensity of the second light source based on a second light intensity value, a first image sensor configured to receive the light that is emitted from the first light source and is reflected by an object, and a second image sensor configured to receive the light that is emitted from the first light source and the second light source and is reflected by the object. The circuitry is configured to set a light intensity value that satisfies a first light intensity condition as the first light intensity value, based on data output from the first image sensor while the first light source is turned on, and the circuitry is configured to set a light intensity value that satisfies a second light intensity condition as the second light intensity value, based on data output from the second image sensor while the first light source is turned on.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 14A, FIG. 14B1, FIG. 14B2, FIG. 14B3, FIG. 14C1, FIG. 14C2, and FIG. 14C3 are diagrams to perform comparison between a document to be scanned and an output image output from an image sensor as the document is scanned one time, according to an embodiment of the present disclosure.

Figure 1:
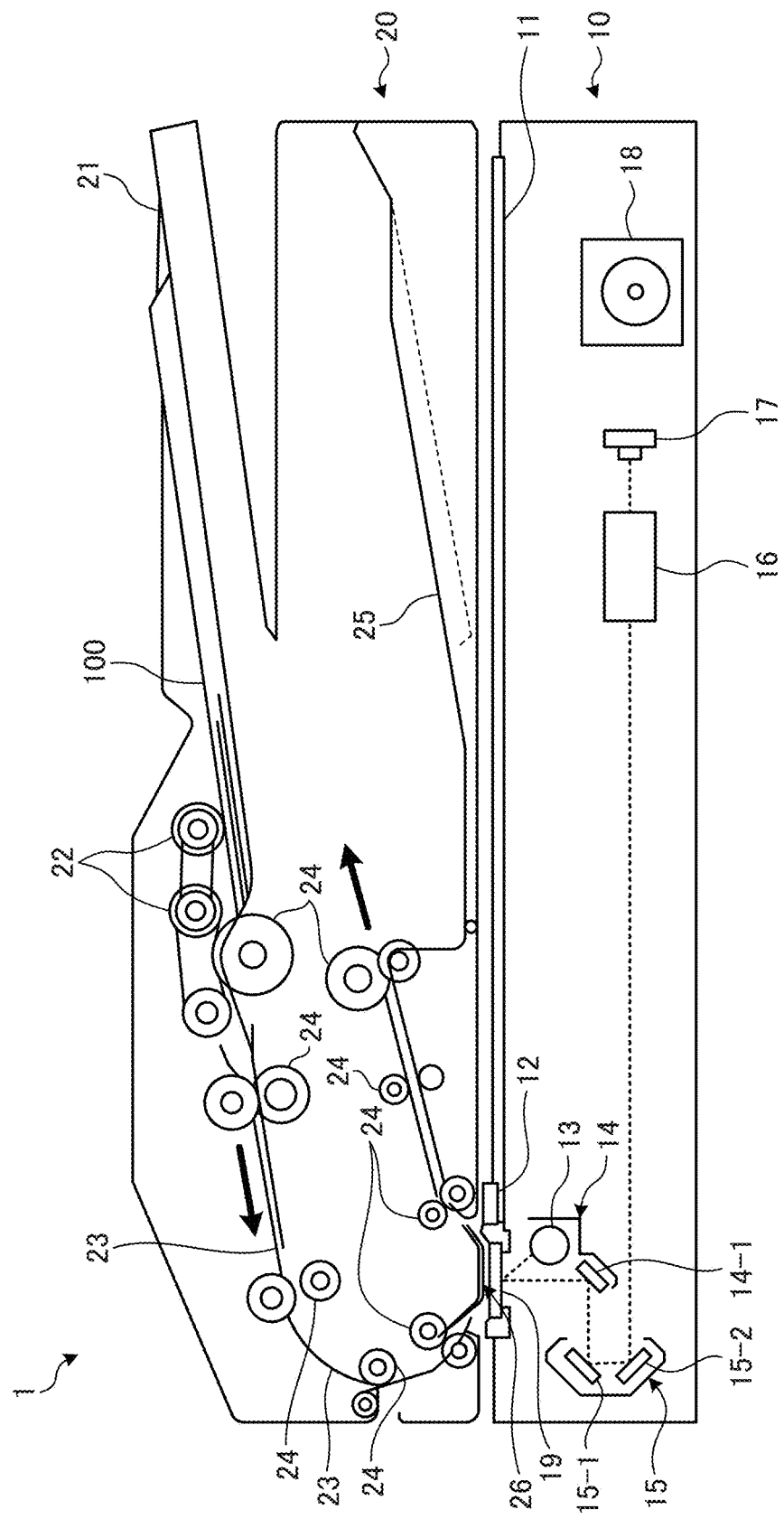
FIG. 1 is a diagram illustrating a reading device according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific integrated circuits (ASICs), field-programmable gate arrays (FPGAs), computers or the like. These terms may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

A reading device, an image forming apparatus, and a method according to an embodiment of the present disclosure is described below in detail with reference to the accompanying drawings. In the following description, the term "visible" refers to a wavelength range of visible light, and the term "invisible" refers to a wavelength range of, for example, infrared rays or ultraviolet rays other than the visible light. For example, it is assumed that the wavelength range of invisible light is equal to or shorter than 380 nanometers (nm) or equal to or longer than 750 nm. In the following description, for example, a document is used as an object. However, no limitation is indicated thereby, and it is assumed that a reference member or the like at a scanning position of such a document serves as an object while the document or the like is not being scanned. In the present embodiment, the light that is emitted from the light source is reflected by an object and is incident on the image sensor.

First Embodiment

FIG. 1 is a diagram illustrating a reading device 1 according to a first embodiment of the present disclosure.

More specifically, FIG. 1 illustrates a configuration of the reading device 1 equipped with an automatic document feeder (ADF), according to the present embodiment.

A reading device main body 10 has a contact glass 11 on a top face, and includes, for example, a light source 13, a first carriage 14, a second carriage 15, a lens unit 16, a sensor board 17 inside the reading device main body 10 that together serve as a scanner for a reduction optical system. In FIG. 1, the first carriage 14 includes the light source 13 and a reflection mirror 14-1, and the second carriage 15 includes reflection mirrors 15-1 and 15-2.

The light source 13 includes a first light source 13*a* and a second light source 13*b,* and both the first light source 13*a* and the second light source 13*b* are turned on. The first light source 13*a* and the second light source 13*b* use light sources having different wavelength ranges. For example, the first light source 13*a* is a light source that emits invisible light such as infrared light other than the light in a wavelength range of visible light, and the second light source 13*b* is a light source that emits visible light such as red light in wavelength range of visible light. An object to be read is irradiated with the light that is emitted from both the first light source 13a and the second light source 13b of the light source 13, and the light reflected by the object to be read is reflected by the reflection mirror 14-1 of the first carriage 14 or the reflection mirrors 15-1 and 15-2 of the second carriage 15. Then, the reflected light is incident on the lens unit 16, and the image of the object to be read is formed on the photo-sensing surface of the sensor board 17. The sensor board 17 includes a line sensor such as a charge coupled device (CCD) or a complementary metal oxide semiconductor (CMOS). The line sensor according to the present embodiment sequentially converts an image of the light emitted from the second light source 13b formed on the photo-sensing surface into an electrical signal to output a second image, and sequentially converts an image of the light emitted from the first light source 13a formed on the photo-sensing surface into an electrical signal to output a first image.

In the present embodiment, the reading device 1 simultaneously irradiates an object to be scanned with the light emitted from the first light source 13a and the light emitted from the second light source 13b. The line sensor according to the present embodiment captures an image of the light emitted from the first light source 13a using a first image sensor dedicated to receiving the light of the first light source 13a, and outputs a first image. Moreover, the line sensor according to the present embodiment captures an image of the light emitted from the second light source 13b using a second image sensor dedicated to receiving the light of the second light source 13b, and outputs a second image. For example, when it is assumed that the first light source 13a emits infrared light, an infrared (IR) sensor can be used as the first image sensor. When it is assumed that the second light source 13b emits visible light, an image sensor of red (R), green (G), and blue (B) can be used as the image sensor that has sensitivity to visible light.

A reference white board 12 is used to correct, for example, the changes in radiation intensity of light of the light source 13 or the variations in the pixel array of the line sensor.

The reading device 1 is provided with a control board on the reading device main body 10, and controls each element of the reading device main body 10 and each element on the ADF 20 to perform scanning on an object with a predetermined scanning method.

For example, the reading device 1 uses the ADF 20 to perform scanning of sheet-through type on a document 100. In the configuration illustrated in FIG. 1, the reading device 1 uses a pickup roller 22 to separate the document on a one-piece-by-one-piece basis from a bundle of documents on a tray 21 of the ADF 20, and conveys the document 100 to a conveyance path 23. Then, a side of the document 100 to be read is scanned at a predetermined scanning position, and the document 100 is ejected to an output tray 25. The document 100 is conveyed by the rotation of various types of conveyance rollers 24.

In the reading device 1, for example, the first carriage 14 and the second carriage 15 are moved to a predetermined home position and fixed thereto, and the document 100 is scanned and obtained when the document 100 passes through a gap between the scanning window 19 and a background unit 26. The scanning window 19 is a slit-shaped scanning window formed on a part of the contact glass 11, and the document 100 is scanned in the sub-scanning direction as the document 100 is automatically conveyed and passes through the scanning window 19. The background unit 26 is a background member of a predetermined background color arranged at a position opposed to the slit. While the document 100 is passing through the scanning window 19, the reading device 1 uses the multiple line sensors on the sensor board 17 to sequentially read the light that is emitted from the light source 13 and then reflected by the first face of the document 100 facing the scanning window 19. The first face of the document 100 may be the front side or the rear side of the document.

In the case of performing double-sided scanning of the document 100, for example, a turning mechanism is arranged to reverse the front and back sides. As a turning mechanism is provided for the reading device 1, the document 100 can be reversed, and the second face of the document 100 can be scanned through the scanning window 19. However, no limitation is intended thereby, and the images of both sides of the document may be scanned using a different kind of mechanism or configuration other than the turning mechanism. For example, after the document pas passed through the scanning window 19, the second face of the document 100 may be scanned by a reading unit arranged on the rear side of the document 100. In such cases, for example, a white member that is disposed at a position facing the reading unit serves as the background portion.

In the configuration of the reading device 1 according to the present embodiment, flatbed scanning can also be performed. More specifically, the ADF 20 is lifted to expose the contact glass 11, and the document 100 is directly disposed on the contact glass 11. Then, the ADF 20 is lowered to the original position, and the rear side of the document 100 is pressed and held by the lower portion of the ADF 20. In the flatbed scanning, as the document 100 is fixed, the first carriage 14 and the second carriage 15 are moved relative to the document 100 to scan the document. The first carriage 14 and the second carriage 15 are driven by a scanner motor 18 to scan the document 100 in the sub-scanning direction. For example, the first carriage 14 moves at a speed V, and the second carriage 15 moves at a speed ½ V which is half the speed of the first carriage 14 in conjunction with the movement of the first carriage 14. By so doing, the first face of the document 100 on the contact glass 11 side is scanned. In such cases, the lower portion of the ADF 20, which is, for example, a white member that presses the document 100 from the rear side, serves as the background portion.

In the present embodiment, for example, the first carriage 14, the second carriage 15, the lens unit 16, and the sensor board 17 are separately illustrated, but these elements may be individually provided or may be provided as an integrated sensor module.

In the present embodiment, an image of the light that is emitted from the second light source is captured using the second image sensor that has sensitivity to the light in the wavelength region of the light of the second light source 13b, and a method of preventing color mixture caused by simultaneous irradiation with the light of the first light source 13a by adjusting the intensity of light is described. The second image sensor may also have sensitivity to the wavelength region of the light emitted from the first light source 13a. In such cases, when the second image sensor is simultaneously irradiated with the light of the first light source 13a, the second image sensor also detects light components of the first light source 13a. As a result, a signal in which the light from the first light source 13a is also superimposed is output from the second image sensor, and color mixture tends to occur in the output image, i.e., the second image.

Figure 2:
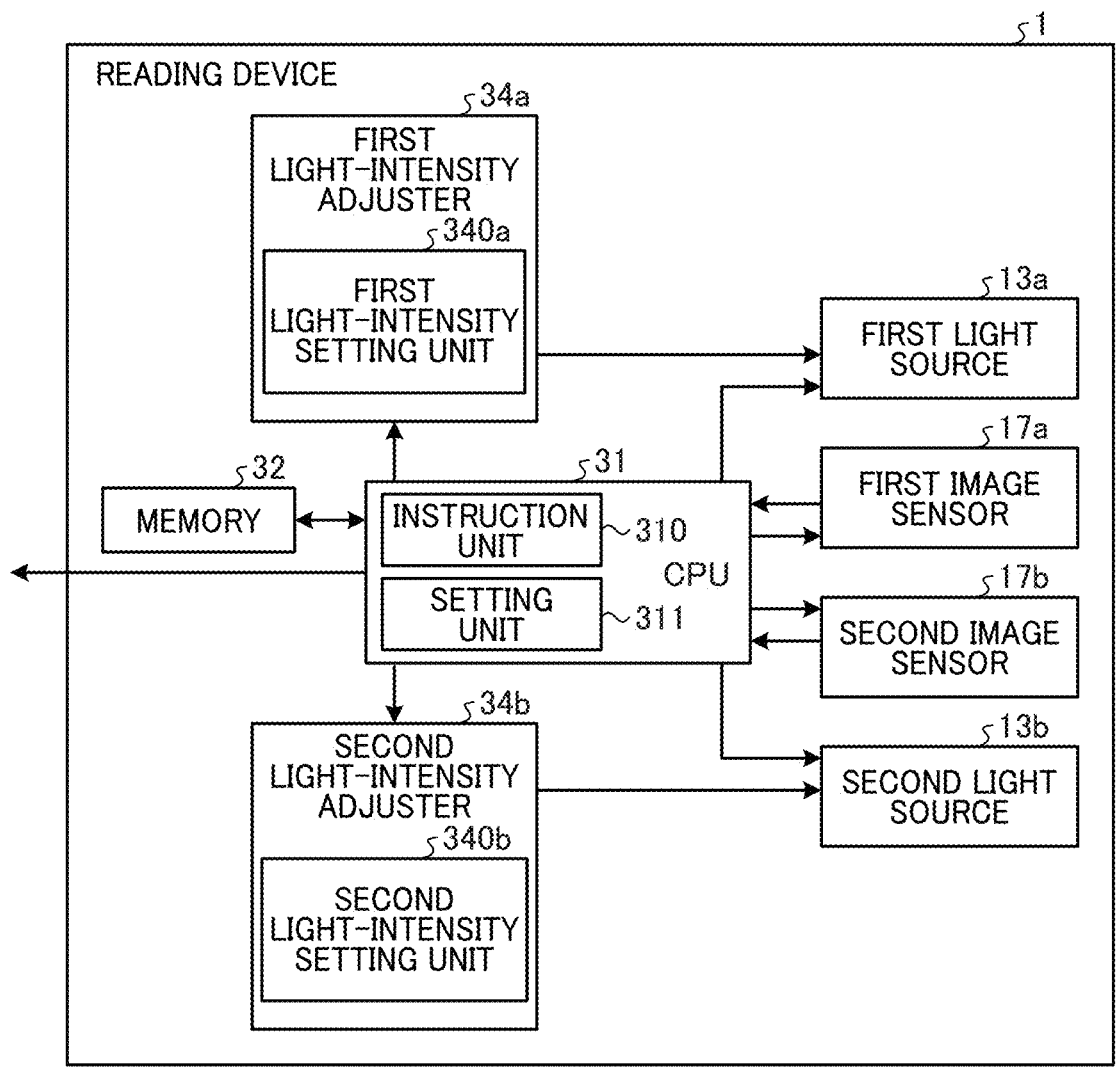
FIG. 2 is a diagram illustrating a configuration of a processing unit that adjusts the intensity of light of a reading device, according to an embodiment of the present disclosure.

FIG. 2 is a diagram illustrating a configuration of a processing unit that adjusts the intensity of light of the reading device 1, according to the present embodiment.

More specifically, FIG. 2 illustrates a configuration in which the CPU 31 adjusts the light intensity in the present embodiment. In FIG. 2, for example, a processing unit and an object to be controlled that relate to the light intensity adjustment are explicitly illustrated.

A central processing unit (CPU) 31 is a processor that controls the entirety of the reading device 1 based on a control program stored in a read only memory (ROM) or the like. In the present embodiment, the CPU 31 also performs various kinds of processes such as light intensity adjustment of the first light source 13a and the second light source 13b. For example, the CPU 31 according to the present embodiment executes a light intensity adjustment program to implement an instruction unit 310 and a setting unit 311 as functional units, and adjusts the intensity of light of the first light source 13a and the second light source 13b before the document is scanned.

The instruction unit 310 turns on or turns off the first light source 13a and the second light source 13b in a predetermined procedure. The setting unit 311 acquires the output data from the first image sensor 17a and the second image sensor 17b whenever necessary, and calculates and sets a light intensity value that satisfies a light intensity condition based on the acquired output data.

The CPU 31 according to the present embodiment sets a light intensity value that satisfies a first light intensity condition as a light intensity value of the first light source 13a based on the first image that is the data output from the first image sensor 17a. Such a light intensity value of the first light source 13a may be referred to as the first light intensity value in the following description. Moreover, the CPU 31 according to the present embodiment sets a light intensity value that satisfies a second light intensity condition as a light intensity value of the second light source 13b based on the second image that is the data output from the second image sensor 17b. Such a light intensity value of the second light source 13b may be referred to as the second light intensity value in the following description.

The memory 32 is a storage unit such as a random access memory (RAM) used as a work area by the CPU 31. For example, the memory 32 is used when the CPU 31 holds the data on a temporary basis while adjusting the intensity of light.

A first light-intensity adjuster 34a adjusts the light intensity of the first light source 13a based on the light intensity value set to a first light-intensity setting unit 340a.

A second light-intensity adjuster 34b adjusts the light intensity of the second light source 13b based on the light intensity value set to a second light-intensity setting unit 340b.

Some of or all of the instruction unit 310 and the setting unit 311 may be arranged and implemented in the first light-intensity adjuster 34a and the second light-intensity adjuster 34b. In such cases, for example, the first light-intensity adjuster 34a and the second light-intensity adjuster 34b instruct the first light source 13a and the second light source 13b to turn on and turn off, and obtain the output data from the first image sensor 17a and the second image sensor 17b as necessary. Further, the first light-intensity adjuster 34a and the second light-intensity adjuster 34b calculate the first light intensity value and the second light intensity value that satisfy the first light intensity condition and the second light intensity condition of the first light source 13a and the second light source 13b, respectively, and set the calculated first and second light intensity values to the first light-intensity setting unit 340a and the second light-intensity setting unit 340b, respectively. In such cases, the memory required for the light intensity adjustment may be arranged in the hardware of the first light-intensity adjuster 34a and the second light-intensity adjuster 34b. In the following description, it is assumed that the first light intensity condition is the light intensity condition of the first light source 13a, and the second light intensity condition is the light intensity condition of the second light source 13b.

Figure 3:
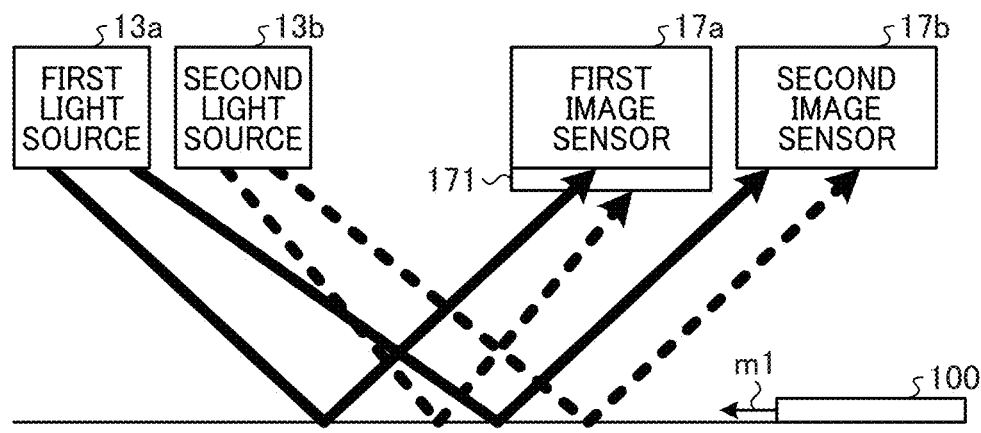
FIG. 3 is a diagram illustrating a configuration of a pair of light sources and a pair of image sensors, according to an embodiment of the present disclosure.

FIG. 3 is a diagram illustrating a configuration of a pair of light sources and a pair of image sensors, according to the present embodiment.

More specifically, FIG. 3 schematically illustrates the relation in arrangement between an object and a pair of light sources and a pair of image sensors as well as how the lights emitted from the pair of light sources are reflected by the object and are incident on the pair of image sensors, according to the present embodiment. As illustrated in FIG. 3, the light that is emitted from the first light source 13a is reflected by the document at the scanning position, and is incident on the first image sensor 17a. In a similar manner, the light that is emitted from the second light source 13b is reflected by the document at the scanning position, and is incident on the second image sensor 17b. The document 100 is arranged at a scanning position, and is irradiated with the light emitted from the first light source 13a and the second light source 13b at the scanning position. Then, the reflected light is incident on the first image sensor 17a and the second image sensor 17b and read.

In the present embodiment as illustrated in FIG. 3, the document 100 is conveyed by a conveyance system in the direction as indicated by an arrow m1. As the document 100 passes through the scanning position, the light that is emitted from the first light source 13a is reflected by the document 100, and is incident on the first image sensor 17a. In a similar manner, the light that is emitted from the second light source 13b is reflected by the document 100, and is incident on the second image sensor 17b. However, as illustrated in FIG. 3, each of the reflection lights from the first light source 13a and the second light source 13b is also incident on the other image sensor. In particular, the reflection lights from the first light source 13a and the second light source 13b are incident on the second image sensor 17b and the first image sensor 17a, respectively. In such a configuration, color mixture is inevitable and the light intensity is to be adjusted.

In the present embodiment, a filter 171 is provided for the first image sensor 17a to block the light emitted from the second light source 13b. For example, the filter 171 is implemented by arranging a filter that absorbs or reflects the light emitted from the second light source 13b on the photo-sensing surface of the first image sensor 17a. Due to such a configuration, the first image sensor 17a can substantially block the light from the second light source 13b, and can receive only the light from the first light source 13a.

On the other hand, the light of the first light source 13a and the light of the second light source 13b are incident on the second image sensor 17b, and the second image sensor 17b has light-receptive sensitivity not only to the wavelength region of the light of the second light source 13b but also to the wavelength region of the light of the first light source 13a.

The first image sensor 17a and the second image sensor 17b are adjacent to each other or closed to each other, and the other light, that is, the light of the first light source 13a is also incident on the second image sensor 17b.

In the present embodiment, the filter 171 serves as an avoidance unit used to prevent the light of the second light source 13b from entering the first image sensor 17a. Any other means or units other than the filter 171 may be used as an avoidance unit as long as the purpose can be achieved. For example, the second image sensor 17b may be disposed at a position on which the light from the first light source 13a is not incident. In other words, the second image sensor 17b may be disposed at a position distant from the first image sensor 17a.

In such a configuration as described above, the reading device 1 adjusts the intensity of light as follows. More specifically, the intensity of light is adjusted as follows as the CPU 31 executes a light intensity adjustment program while accessing the memory 32 as necessary.

Figure 4:
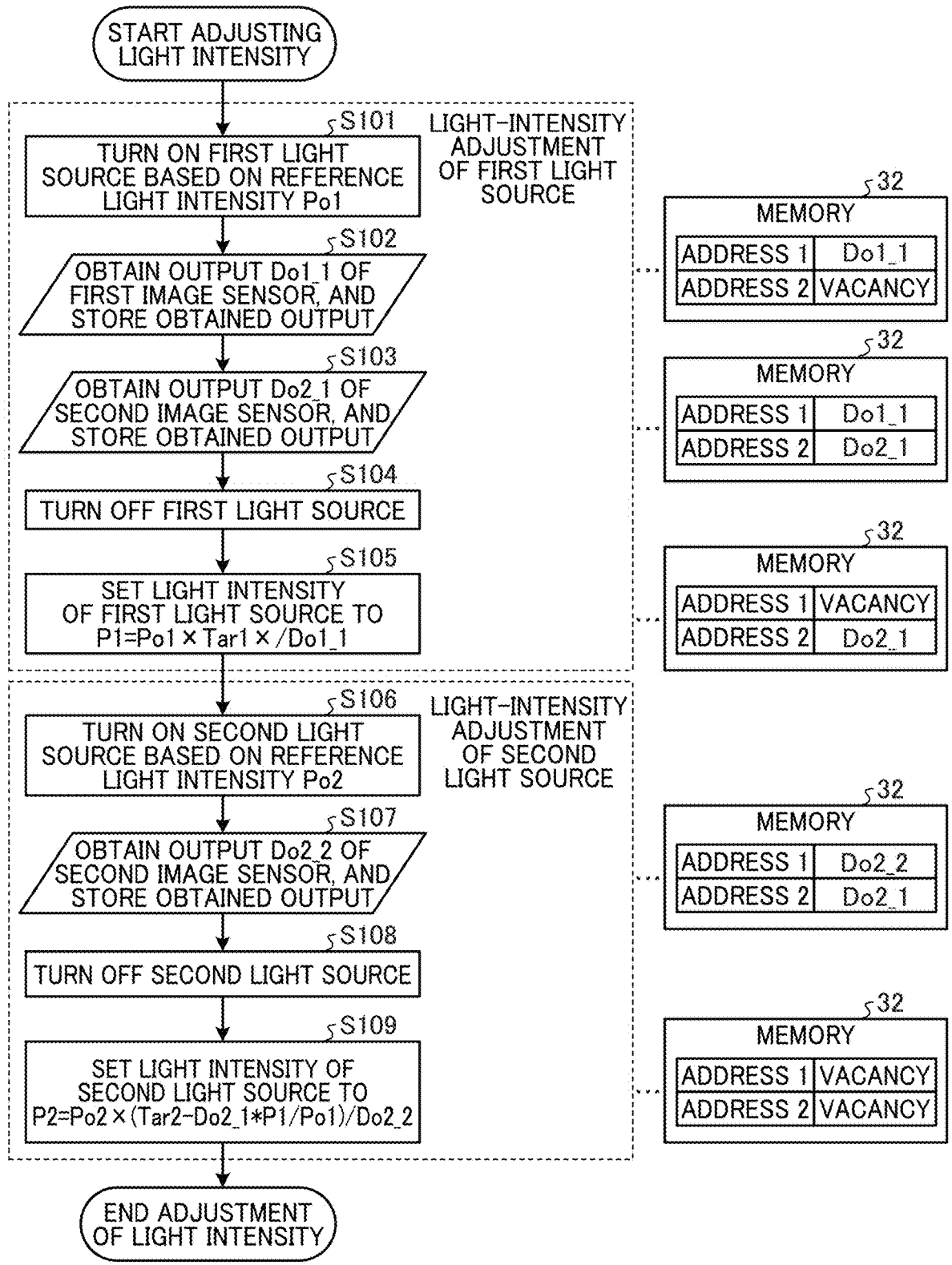
FIG. 4 is a flowchart of a first pattern of light intensity adjustment for a reading device, according to an embodiment of the present disclosure.

FIG. 4 is a flowchart of a first pattern of light intensity adjustment for the reading device 1, according to the present embodiment.

Firstly, in a step S101, the CPU 31 according to the present embodiment turns on the first light source 13a based on the setting of reference light intensity Po1, and starts adjusting the light intensity of the first light source 13a.

Secondly, in a step S102, the CPU 31 according to the present embodiment obtains an output Do1_1 of the first image sensor 17a when the first light source 13a emits light based on the reference light intensity Po1, and stores the obtained output in an address 1 of the memory 32. Do1_1 indicates the reference data of the first image sensor 17a when the first light source 13a emits light based on the reference light intensity Po1.

Then, in a step S103, the CPU 31 according to the present embodiment obtains an output Do2_1 of the second image sensor 17b when the first light source 13a emits light based on the reference light intensity Po1, and stores the obtained output in the address 2 of the memory 32. Do2_1 indicates the degree of color mixture of the first light source 13a with respect to the second image sensor 17b.

Subsequently, in a step S104, the CPU 31 turns off the first light source 13a. In a step S105, the CPU 31 calculates a light intensity value P1 that satisfies the light intensity conditions of the first light source 13a, and sets the calculated light intensity value P1 to the first light-intensity setting unit 340a. The light intensity condition of the first light source 13a is, for example, P1=Po1×Tar1/Do1_1. Tar1 that is included in the light intensity condition indicates a predetermined light intensity adjustment target value. In the present step, the CPU 31 reads Do1_1 from the memory 32 in order to calculate the light intensity value P1. Accordingly, address 1 can be released. The light intensity adjustment of the first light source 13a is completed in these steps up to the step S105.

Subsequently, in a step S106, the CPU 31 according to the present embodiment turns on the second light source 13b based on the setting of reference light intensity Po2, and starts adjusting the light intensity of the second light source 13b.

Then, in a step S107, the CPU 31 according to the present embodiment obtains an output Do2_2 of the second image sensor 17b when the second light source 13b emits light based on the reference light intensity Po2, and stores the obtained output in the address 1 of the memory 32. Do2_2 indicates the reference data of the second image sensor 17b when the second light source 13b emits light based on the reference light intensity Po2.

Subsequently, in a step S108, the CPU 31 turns off the second light source 13b. In a step S109, the CPU 31 calculates a light intensity value P2 that satisfies the light intensity conditions of the second light source 13b, and sets the calculated light intensity value P2 to the second light-intensity setting unit 340b. The light intensity condition of the second light source 13b is, for example, P2=Po2×(Tar2−D2_1×P1/Po1)/Do2_2. Tar2 that is included in the light intensity condition indicates a predetermined light intensity adjustment target value. In the present step, the CPU 31 reads Do2_1 and Do2_2 from the memory 32 in order to calculate the light intensity value P2. Accordingly, address 1 and address 2 can be released. The light intensity adjustment of the second light source 13b is completed in these steps from the step S106 to the step S109.

The storage unit in which Do1_1 and Do2_1 are stored is not limited to the memory 32 provided for the reading device 1, and may be an external memory disposed outside the reading device 1.

Due to the light intensity adjustment of the first pattern as described above, the addresses to be used for the light-intensity adjustment are as few as addresses 1 and 2, and the capacity of the memory 32 can be reduced without increasing the length of time required to adjust the light intensity.

Unlike the combination of the second light source 13b and the first image sensor 17a, it is not necessary to acquire and hold the degree of color mixture for a combination of a light source and an image sensor that do not substantially cause color mixture. Accordingly, the acquisition and holding of data can be omitted, and the light intensity can appropriately be adjusted even if the capacity of the memory 32 is reduced proportionately.

Figure 5:
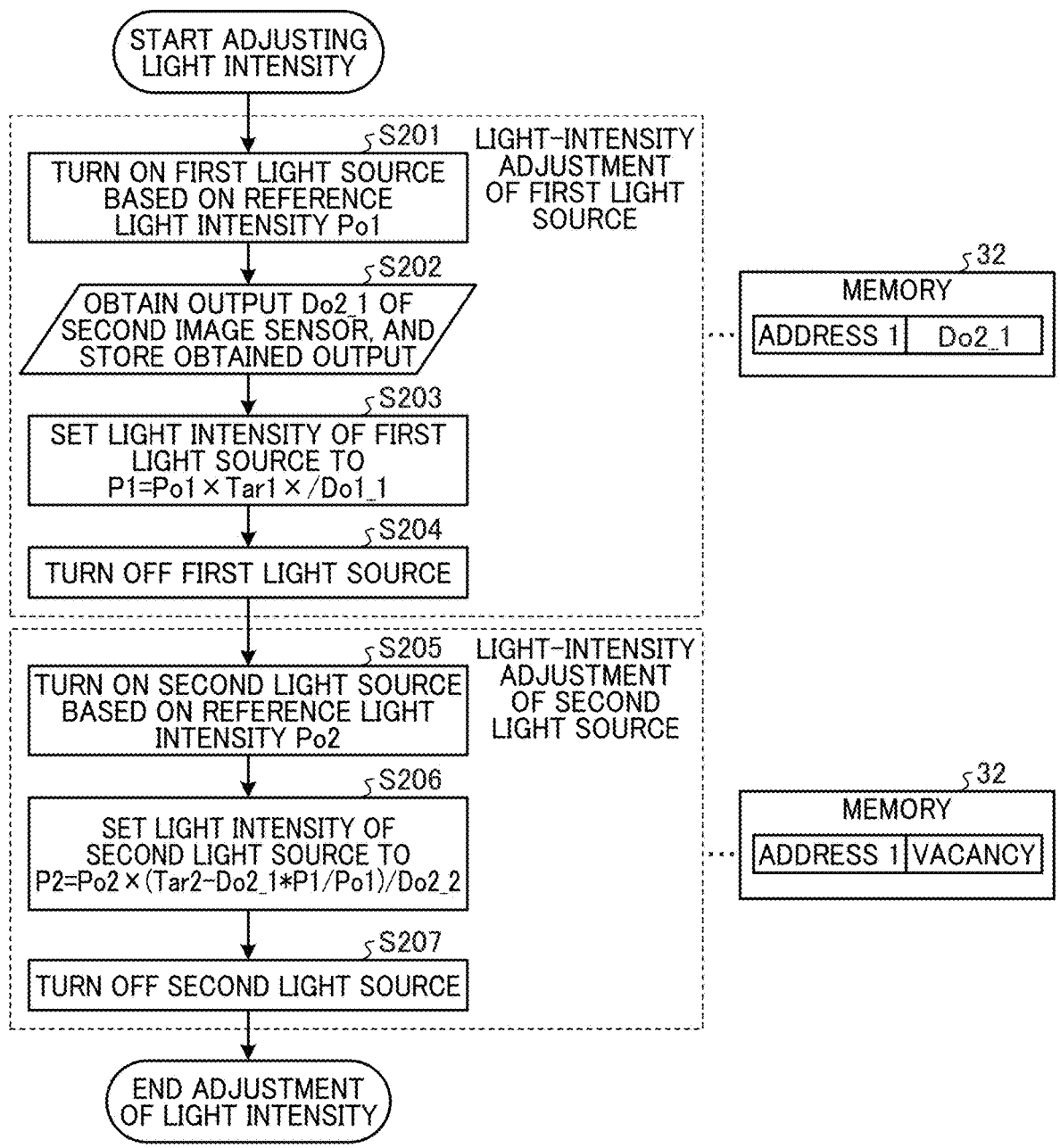
FIG. 5 is a flowchart of a second pattern of light intensity adjustment for a reading device, according to an embodiment of the present disclosure.

FIG. 5 is a flowchart of a second pattern of light intensity adjustment for the reading device 1, according to the present embodiment.

Firstly, in a step S201, the CPU 31 according to the present embodiment turns on the first light source 13a based on the setting of reference light intensity Po1, and starts adjusting the light intensity of the first light source 13a.

Then, in a step S202, the CPU 31 according to the present embodiment obtains an output Do2_1 of the second image sensor 17b when the first light source 13a emits light based on the reference light intensity Po1, and stores the obtained output in the address 1 of the memory 32.

Then, in a step S203, the CPU 31 calculates a light intensity value P1 that satisfies the light intensity conditions of the first light source 13a, and sets the calculated light intensity value P1 to the first light-intensity setting unit 340a.

Subsequently, in a step S204, the CPU 31 turns off the first light source 13a. The light intensity adjustment of the first light source 13a is completed in these steps up to the step S204.

Subsequently, in a step S205, the CPU 31 according to the present embodiment turns on the second light source 13b based on the setting of reference light intensity Po2. Then, in a step S206, the CPU 31 calculates a light intensity value P2 that satisfies the light intensity conditions of the second light source 13b, and sets the calculated light intensity value P2 to the second light-intensity setting unit 340b. In the present step, the CPU 31 reads Do2_1 from the memory 32 in order to calculate the light intensity value P2. Accordingly, address 1 can be released.

Subsequently, in a step S207, the CPU 31 turns off the second light source 13b. The light intensity adjustment of the second light source 13b is completed in these steps from the step S205 to the step S207.

As in the flow of the second pattern described above, if the output of the image sensor is read and the light intensity is set while the light source whose light intensity is to be adjusted is kept turned on, the output of image sensor serves as an alternative to a memory. Due to such a configuration, as long as the flow of the second pattern is adopted, it is not necessary to hold Do1_1 in the memory, and the light intensity can appropriately be adjusted with a memory whose capacity is smaller than that of the first pattern.

Figure 6:
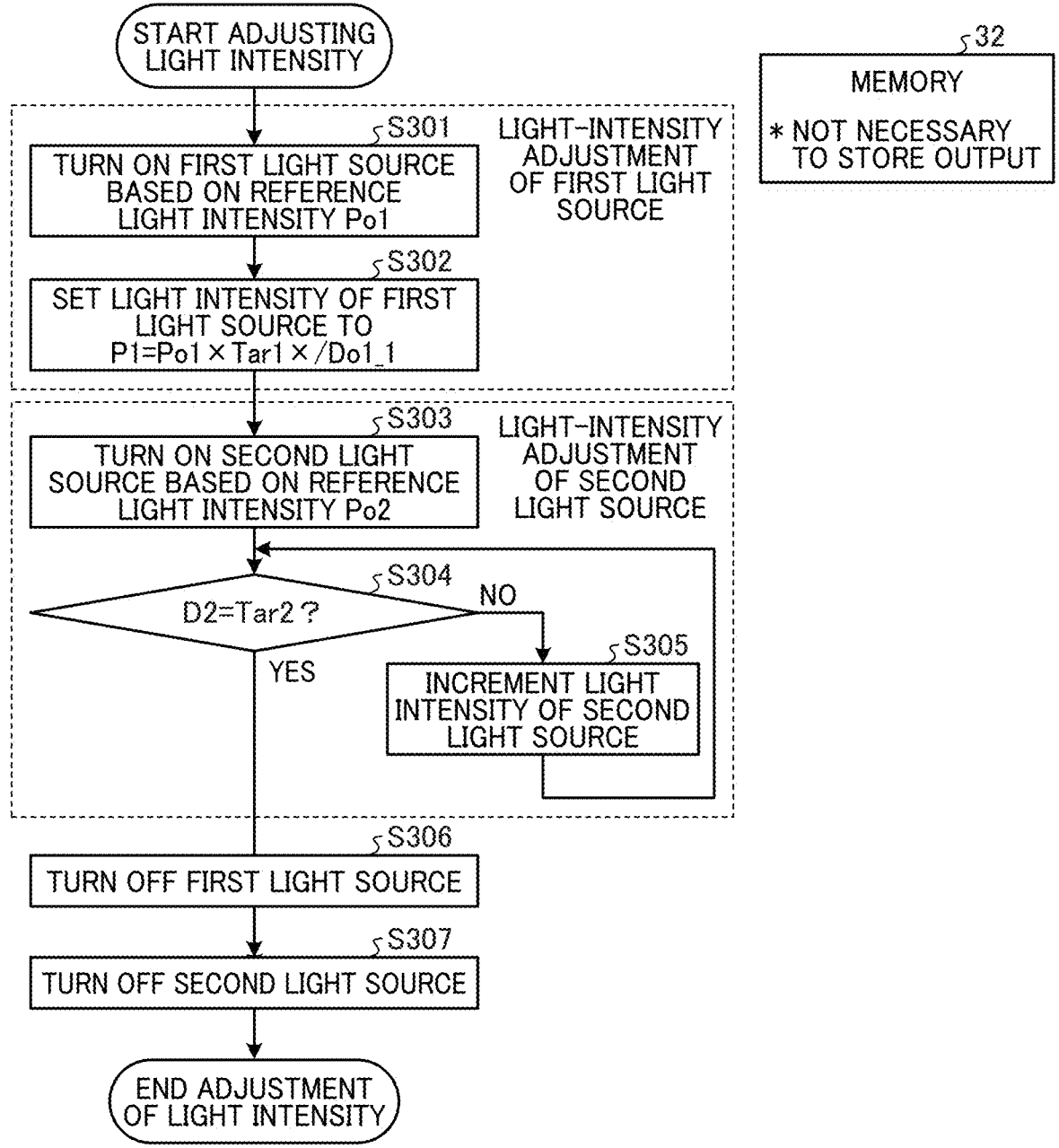
FIG. 6 is a flowchart of a third pattern of light intensity adjustment for a reading device, according to an embodiment of the present disclosure.

FIG. 6 is a flowchart of a third pattern of light intensity adjustment for the reading device 1, according to the present embodiment.

Firstly, in a step S301, the CPU 31 according to the present embodiment turns on the first light source 13a based on the setting of reference light intensity Po1, and starts adjusting the light intensity of the first light source 13a.

Then, in a step S302, the CPU 31 calculates a light intensity value P1 that satisfies the light intensity conditions of the first light source 13a, and sets the calculated light intensity value P1 to the first light-intensity setting unit 340a. The light intensity adjustment of the first light source 13a is completed in these steps up to the step S302.

Subsequently, in a step S303, the CPU 31 according to the present embodiment turns on the second light source 13b based on the setting of reference light intensity Po2.

Subsequently, in a step S304, the CPU 31 determines whether the output D2 of the second image sensor 17b satisfies D2=Tar2.

When the output D2 does not satisfy D2=Tar2 ("NO" in the determination of step S304), in a step S305, the CPU 31 according to the present embodiment increments the light intensity value set in the second light-intensity setting unit 340b in a predetermined unit to increase the light intensity of the second light source 13b. Subsequently, the CPU 31 performs the determination in the S304 again. The predetermined unit in which the light intensity value is incremented may be one or any larger number.

When the output D2 satisfies D2=Tar2 ("YES" in the determination of step S304), the light intensity adjustment of the second light source 13b is completed. Accordingly, in steps S306 and S307, the CPU 31 according to the present embodiment turns off the first light source 13a and the second light source 13b.

As in the flow of the third pattern described above, the light intensity of the first light source 13a is set to a desired light intensity P1, and the light intensity the second light source 13b is adjusted while the first light source 13a is kept turned on with the light intensity P1. Due to such a configuration, the color mixture components of the first light source 13a are substantially included in the output from the second image sensor 17b when the light intensity of the second light source 13b is being adjusted. Due to such light-intensity adjustment as above, the light intensity can appropriately be adjusted without increasing the length of time required to adjust the light intensity. Further, the light intensity can appropriately be adjusted without storing any data in a memory for light-intensity adjustment. In other words, the light intensity can appropriately be adjusted without increasing the capacity of a memory of a general-purpose reading device.

In the flow illustrated in FIG. 6, the light intensity of the second light source 13b is adjusted so as to gradually increase the light intensity. However, no limitation is indicated thereby, and any other methods may be used as long as the sensor output can be adjusted to a light intensity adjustment target value. For example, Po2 may be set to a light intensity where D2≥Tar2, and the light intensity may gradually be reduced. The amount of color mixture that the second image sensor 17b senses from the light emitted from the first light source 13a may be estimated based on the optical characteristics of the first light source 13a and the second image sensor 17b and the light intensity P1 of the first light source 13a whose light intensity has been adjusted, and the light intensity of the second light source 13b may be set based on the estimated amount of color mixture.

Figure 7:
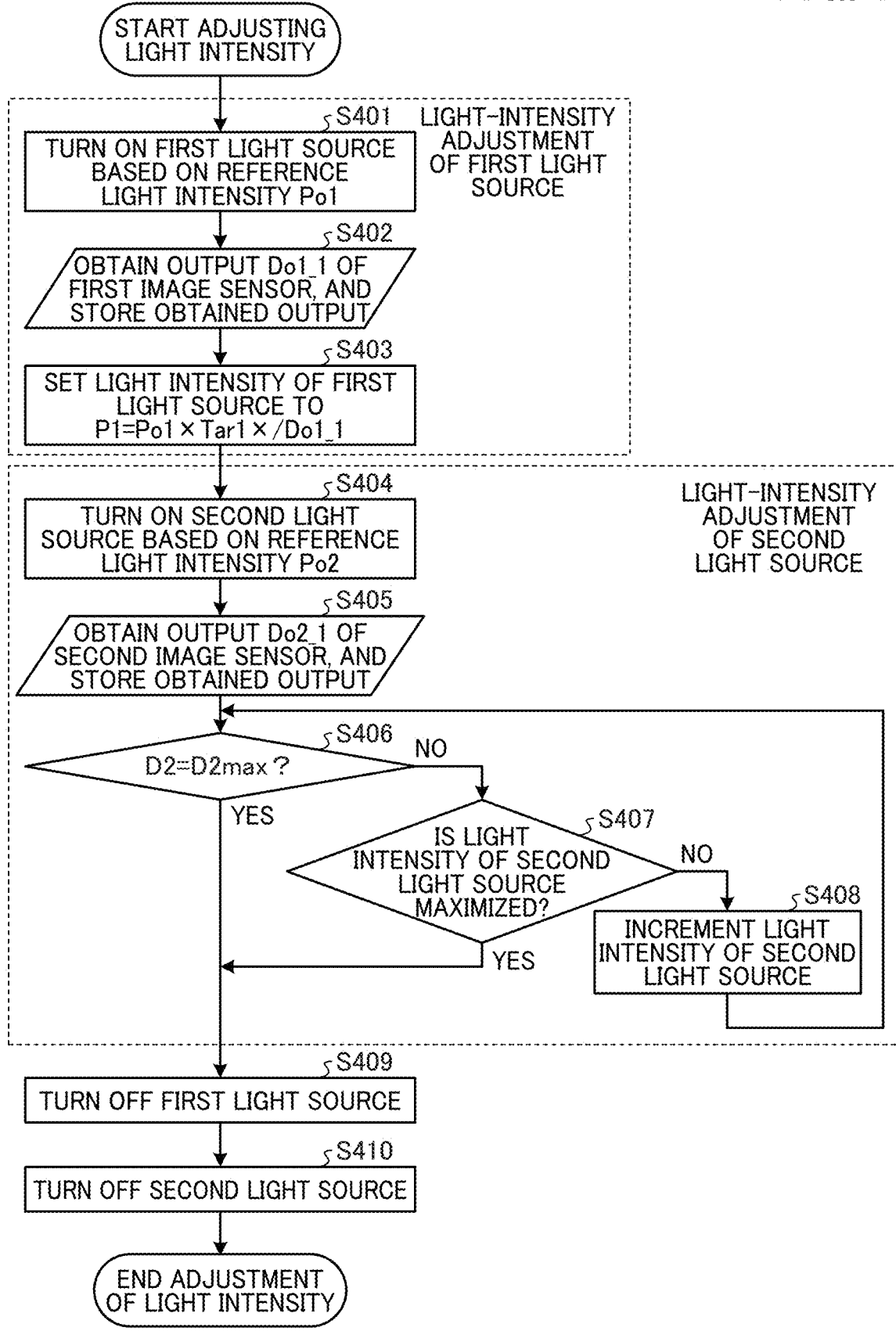
FIG. 7 is a flowchart of a fourth pattern of light intensity adjustment for a reading device, according to an embodiment of the present disclosure.

FIG. 7 is a flowchart of a fourth pattern of light intensity adjustment for the reading device 1, according to the present embodiment.

Firstly, in a step S401, the CPU 31 according to the present embodiment turns on the first light source 13a based on the setting of reference light intensity Po1, and starts adjusting the light intensity of the first light source 13a.

Secondly, in a step S402, the CPU 31 according to the present embodiment obtains an output Do1_1 of the first image sensor 17a when the first light source 13a emits light based on the reference light intensity Po1, and stores the obtained output in an address 1 of the memory 32. Do1_1 indicates the reference data of the first image sensor 17a when the first light source 13a emits light based on the reference light intensity Po1.

Then, in a step S403, the CPU 31 calculates a light intensity value P1 that satisfies the light intensity conditions of the first light source 13a, and sets the calculated light intensity value P1 to the first light-intensity setting unit 340a. In the present step, the CPU 31 reads Do1_1 from the memory 32 in order to calculate the light intensity value P1. Accordingly, address 1 can be released. The light intensity adjustment of the first light source 13a is completed in these steps up to the step S403.

Subsequently, in a step S404, the CPU 31 according to the present embodiment turns on the second light source 13b based on the setting of reference light intensity Po2, and starts adjusting the light intensity of the second light source 13b.

Then, in a step S405, the CPU 31 according to the present embodiment obtains an output Do2_2 of the second image sensor 17b when the second light source 13b emits light based on the reference light intensity Po2, and stores the obtained output in the address 1 of the memory 32. Do2_2 indicates the reference data of the second image sensor 17b when the second light source 13b emits light based on the reference light intensity Po2.

Subsequently, in a step S406, the CPU 31 determines whether the output D2 of the second image sensor 17b satisfies D2=D2max.

When the output D2 does not satisfy D2=D2max ("NO" in the determination of step S406), in a step S407, the CPU 31 according to the present embodiment determines whether the light intensity of the output of the second light source 13b is the maximum output.

When the light intensity of the output of the second light source 13b is not the maximum output ("NO" in the determination of step S407), in a step S408, the CPU 31 according to the present embodiment increments the light intensity value set in the second light-intensity setting unit 340b in a predetermined unit to increase the light intensity of the second light source 13b. Subsequently, the CPU 31 performs the determination in the S406 again. The predetermined unit in which the light intensity value is incremented may be one or any larger number.

When the output D2 satisfies D2=D2max ("YES" in the determination of step S406) or when the light intensity of the output of the second light source 13b reaches the maximum output ("YES" in the determination of step S407), in steps S409 and S410, the CPU 31 according to the present embodiment completes the light intensity adjustment of the second light source 13b, and turns off the first light source 13a and the second light source 13b.

As in the flow of the fourth pattern described above, the condition for satisfying the second light intensity adjustment and ending the light intensity adjustment of the second light source 13b includes not only that the output D2 of the second image sensor 17b is equivalent to the maximum output of the second light source 13b but also that the output D2 of the second image sensor 17b is equivalent to the saturated output value D2max of the second image sensor 17b. By so doing, the light intensity of the second light source 13b can be adjusted to the maximum light intensity within the light intensity in which the second image sensor 17b is not saturated.

Note that D2max does not necessarily have to be the saturated output value of the second image sensor 17b, and may be a value obtained by adding a margin to the saturation output value in view of, for example, the light intensity of the light source that fluctuates due to temperature changes caused by heat generation of electronic devices or the like, the stability of sensor sensitivity, or the stability of spectral characteristics of optical elements.

Figure 8:
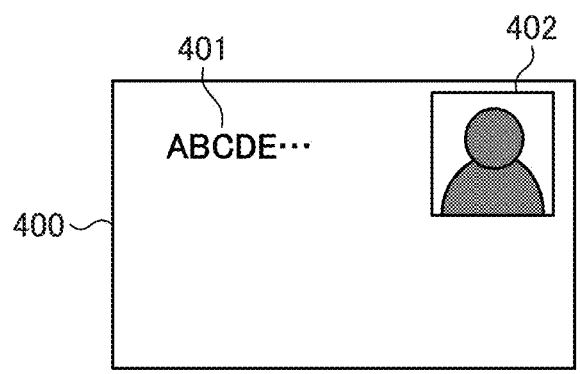
FIG. 8 is a diagram illustrating a document according to an embodiment of the present disclosure.
Figure 9A:
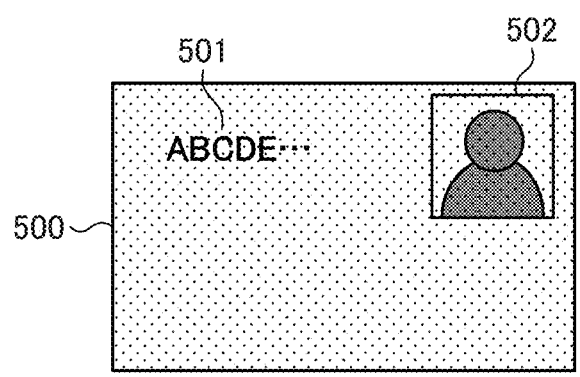
FIG. 9A and FIG. 9B are diagrams to perform comparison between an output image output from an image sensor that has read a document when the maximum light intensity that does not cause saturation is not set and an output image output from an image sensor that has read the document when the maximum light intensity that does not cause saturation is set, according to an embodiment of the present disclosure.
Figure 9B:
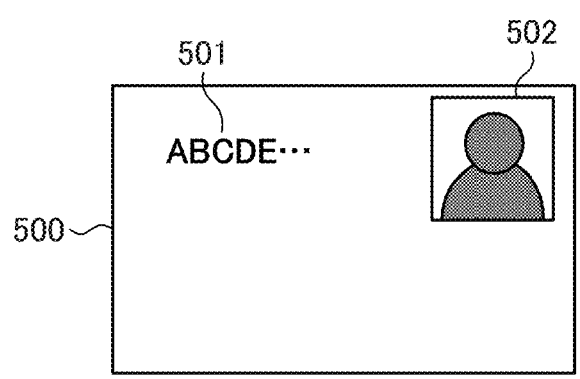

FIG. 8, FIG. 9A, and FIG. 9B are diagrams illustrating the results of comparison between an output from the image sensor when the patterns other than the fourth pattern is adopted in which the maximum light intensity that does not cause saturation is not set and an output from the image sensor when the fourth pattern is adopted in which the maximum light intensity that does not cause saturation is set.

FIG. 8 is a diagram illustrating a certificate 400 according to the present embodiment.

More specifically, FIG. 8 illustrates the certificate 400 that may be a document and includes a text 401 and an image 402. The certificate 400 may be, for example, a business card, a membership card, a student identification card, a driver's license, a passport, and a national identification card used in the national identification number system.

FIG. 9A and FIG. 9B are diagrams to perform comparison between an output image output from the image sensor that has read the certificate 400 as illustrated in FIG. 8 when the maximum light intensity that does not cause saturation is not set (see FIG. 9A) and an output image output from the image sensor that has read the certificate 400 as illustrated in FIG. 8 when the maximum light intensity that does not cause saturation is set (see FIG. 9B), according to the present embodiment.

As known in the art, as the radiation intensity of incident light on the sensor increases, the signal-to-noise (S/N) ratio of the image increases. The S/N ratio indicates a signal-to-noise ratio, and as the S/N ratio is higher, the granularity of the image improves. In FIG. 9A, the maximum light intensity that does not cause saturation is not set. Accordingly, the second image 500, which is a document image output from the second image sensor 17b, tends to become a granular image with a lot of noise as a whole, and the image quality and reproducibility of the text 501 and the image 502 deteriorate compared with that of the text 401 and the image 402 of the certificate 400. On the other hand, in FIG. 9B, the maximum light intensity that does not cause saturation is set. Accordingly, the second image 500, which is a document image output from the second image sensor 17b, becomes an image substantially close to the certificate 400, and good reproducibility is achieved. In other words, if the light intensity of the second light source 13b is adjusted to the maximum light intensity that does not cause saturation to the second image sensor 17b as adopted in the fourth pattern, the image quality of an image scanned by the second image sensor 17b can be improved.

First Modification

In the first embodiment of the present disclosure, the first light source 13a and the second light source 13b emit light in different ranges of wavelength. However, no limitation is indicated thereby, and in one modification of the first embodiment of the present disclosure, the first light source may emit invisible light and the second light source may emit visible light. A configuration of a processing unit of the reading device 1 according to the first modification of the above embodiments of the present disclosure is described below.

Figure 10:
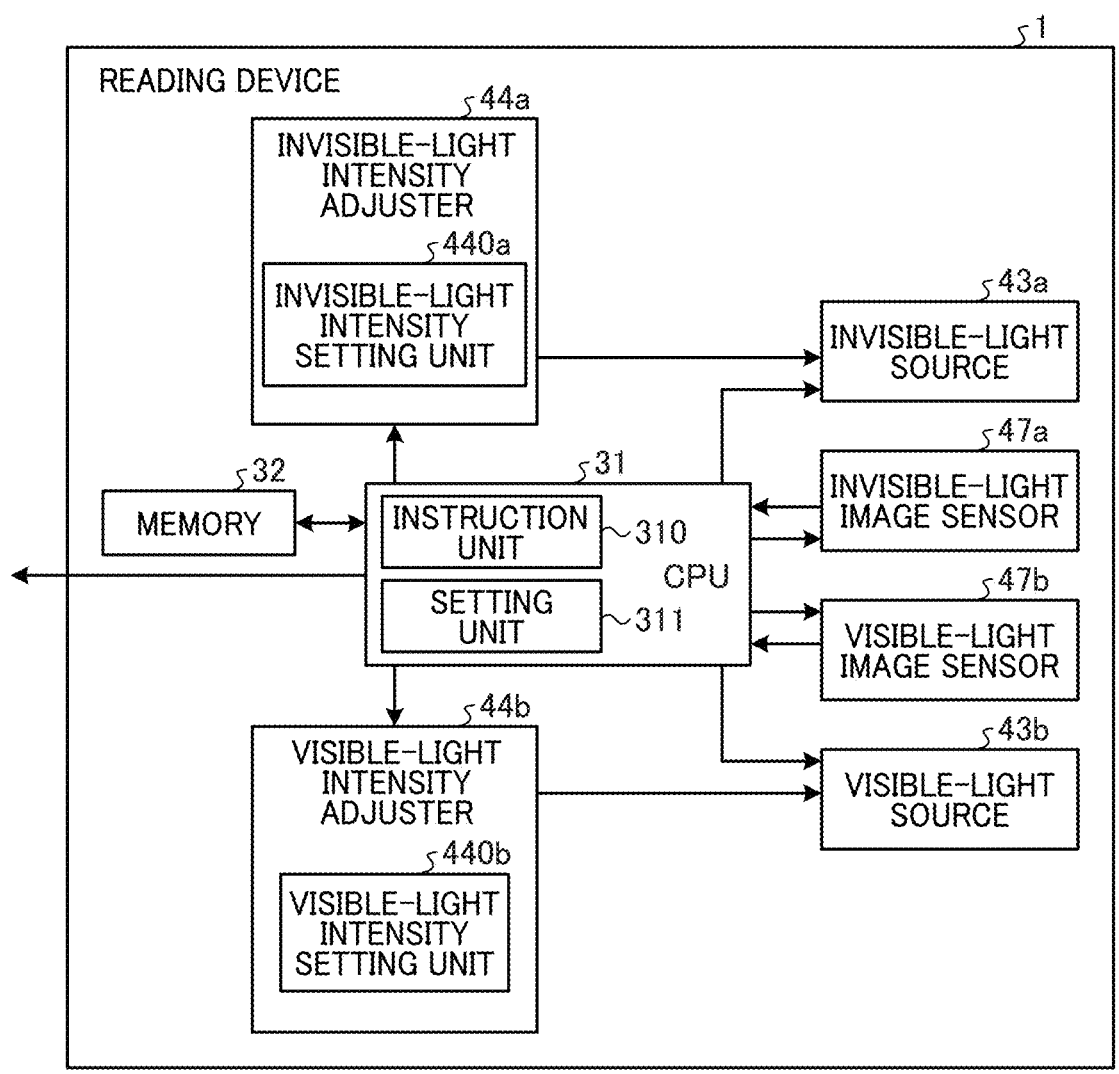
FIG. 10 is a diagram illustrating a configuration of a processing unit that adjusts the intensity of light of a reading device, according to a first modification of the above embodiments of the present disclosure.

FIG. 10 is a diagram illustrating a configuration of a processing unit that adjusts the intensity of light of the reading device 1, according to a first modification of the above embodiments of the present disclosure.

In FIG. 10, in a similar manner to FIG. 2, objects to be controlled and a processing unit in charge of light intensity adjustment when a CPU has a function to adjust the light intensity are illustrated. In comparison to FIG. 2, like reference signs in FIG. 10 denote like elements. The other elements of the reading device 1 as illustrated in FIG. 10 are similar to the elements as illustrated in FIG. 2, but each of the other elements is replaced with an element dedicated to one of invisible light and visible light. The relation between the configuration of FIG. 10 and the configuration of FIG. 2 is as follows.

In FIG. 10, the first light source 13a (see FIG. 2) is replaced with an invisible-light source 43a that is a light source of invisible light. In accordance with such replacement, the first light-intensity adjuster 34a (see FIG. 2) is replaced with an invisible-light intensity adjuster 44a, and the first light-intensity setting unit 340a (see FIG. 2) is replaced with an invisible-light intensity setting unit 440a. Moreover, the first image sensor 17a (see FIG. 2) is replaced with an invisible-light image sensor 47a.

In FIG. 10, the second light source 13b (see FIG. 2) is replaced with a visible-light source 43b that is a light source of visible light. In accordance with such replacement, the second light-intensity adjuster 34b (see FIG. 2) is replaced with a visible-light intensity adjuster 44b, and the second light-intensity setting unit 340b (see FIG. 2) is replaced with a visible-light intensity setting unit 440b. Moreover, the second image sensor 17b (see FIG. 2) is replaced with a visible-light image sensor 47b.

In the case of the reading device 1 according to the present modification of the above embodiments of the present disclosure, an image may be read from a document including visible-light information in a wavelength range of visible light and invisible-light information in wavelength range of invisible light in a one-time image reading or scanning. For example, an image is read from the visible-light information and invisible-light information in a one-time simultaneous image reading or scanning. The light-intensity adjustment aimed at preventing color mixture is executed in any one of the first to fourth patterns according to the first embodiments of the present disclosure as described above to obtain the results as follows.

Figure 11A:
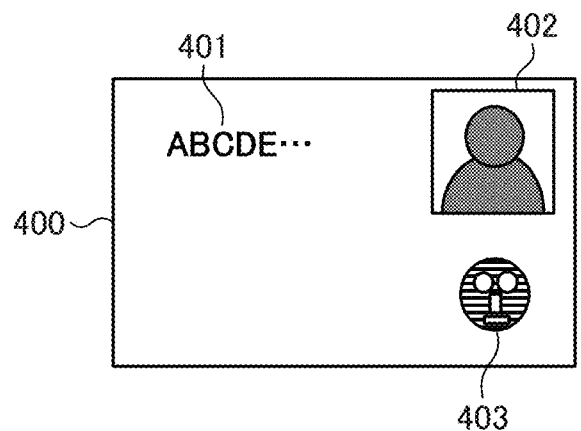
FIG. 11A, FIG. 11B, and FIG. 11C are diagrams to perform comparison between a document to be scanned and an output image output from an image sensor as the document is scanned one time, according to an embodiment of the present disclosure.
Figure 11B:
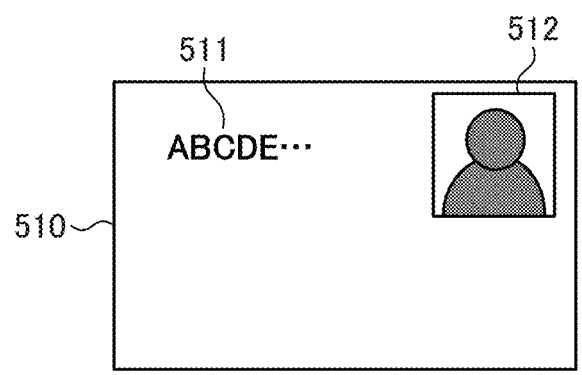
Figure 11C:
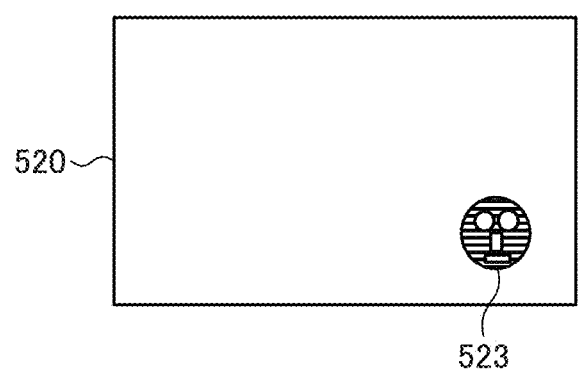

FIG. 11A, FIG. 11B, and FIG. 11C are diagrams to perform comparison between a document to be scanned and an output image output from an image sensor as the document is scanned one time, according to the present embodiment.

FIG. 11A illustrates a document that includes visible-light information and invisible-light information, according to the present modification of the above embodiments. More specifically, FIG. 11A illustrates a certificate 400 that includes a text 401 and an image 402 readable in a visible light range and invisible-light information 403 readable in an invisible light range, according to the present modification of the above embodiments of the present disclosure. As described above, the certificate 400 may be, for example, a business card, a membership card, a student identification card, a driver's license, a passport, and a national identification card used in the national identification number system. For example, the text 401 is text information such as a name or an address, and the image 402 is a photograph of a face. The invisible-light information 403 is information including, for example, a hidden picture and a logo.

As the certificate 400 is irradiated with the light emitted from the invisible-light source 43a and the visible-light source 43b, a visible-light image 510 illustrated in FIG. 11B is output as a second image from the visible-light image sensor 47b. An invisible-light image 520 illustrated in FIG. 11C is output as a first image from the invisible-light image sensor 47a.

The visible-light image 510 includes a text 511 and an image 512 that are obtained by reading the text 401 and the image 402 that belong to the visible-light information. In the visible-light image 510, the light-intensity adjustment is performed as in the first embodiment of the present disclosure, and color mixture due to invisible light is appropriately prevented. Accordingly, the image quality is close to that of the certificate 400.

The invisible-light image 520 includes an invisible-light image 523 that is obtained by reading the invisible-light information 403, and color mixture is well prevented.

First Modification of First Embodiment

Figure 12:
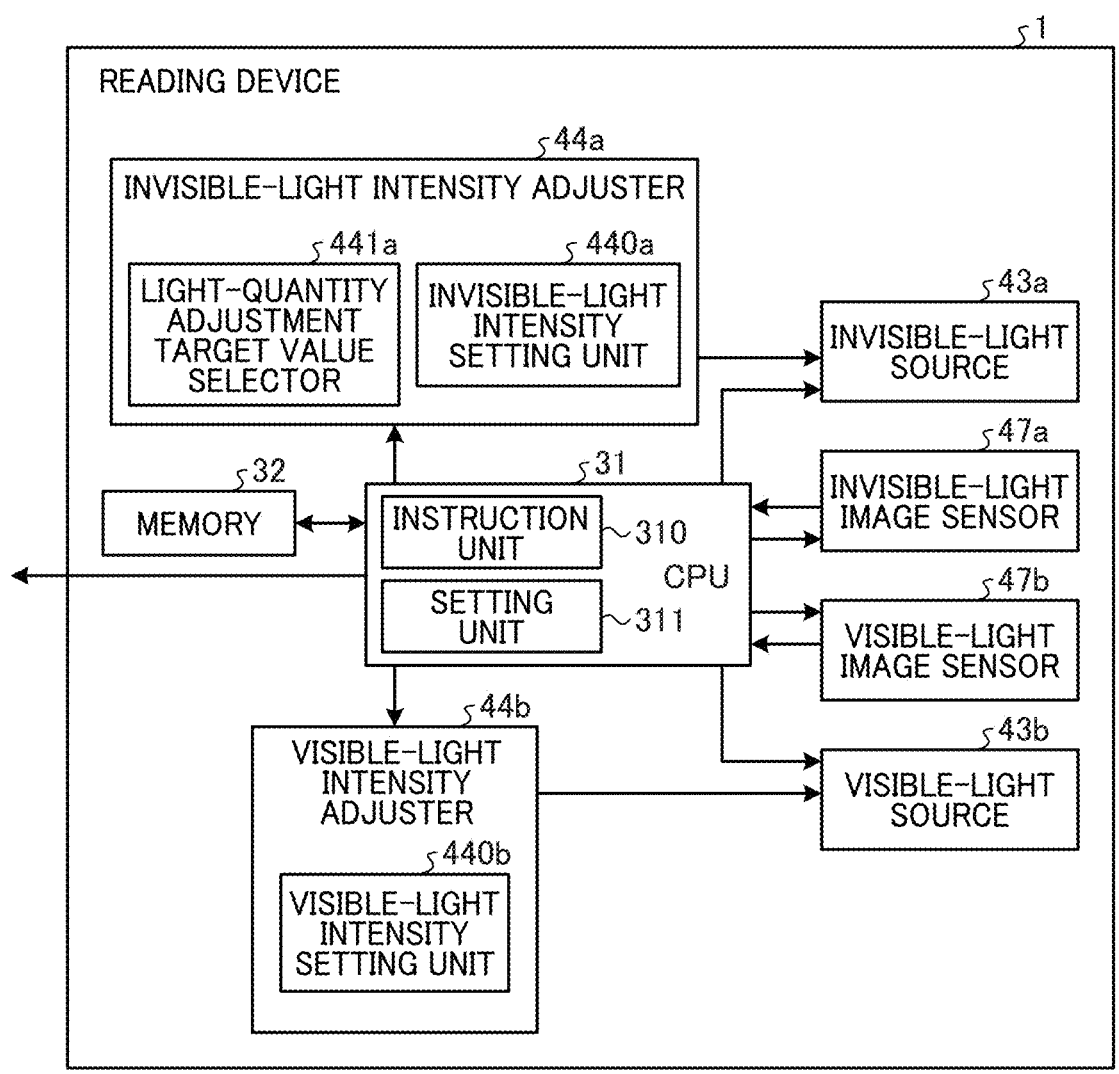
FIG. 12 is a diagram illustrating a configuration of a processing unit that adjusts the intensity of light of a reading device, according to a first modification of the above embodiments of the present disclosure.

FIG. 12 is a diagram illustrating a configuration of a processing unit that performs light intensity adjustment for the reading device 1, according to the first modification of the above embodiments of the present disclosure.

In the reading device 1 as illustrated in FIG. 12, in addition to the configuration as illustrated in FIG. 10, the invisible-light intensity adjuster 44a is further provided with a light-intensity adjustment target value selector 441a for an invisible-light source, which serves as a selector.

The light-intensity adjustment target value selector 441a of the invisible-light source sets the light intensity adjustment target value Tar1 of the invisible-light source 43a to light intensity Tar1bw in which, for example, a hidden picture and a logo of the invisible-light information 403 can be visually recognized. The fineness of a hidden picture or logo and the recognizability by a user varies depending on the light intensity. For this reason, the settings with which each user can easily recognize are determined in advance, and an optimal light intensity adjustment target value is set. In other words, the difference in luminance or brightness between the invisible information and the background of the object, i.e., the background of the certificate 400 is determined in advance, and an optimal light intensity adjustment target value is set. When the invisible-light information 403 and the user are fixed and there is no need to make changes, the light intensity adjustment target value of the invisible-light source 43a is determined to be a unique value. In such cases, in advance, the light-intensity adjustment target value selector 441a of the invisible-light source sets a fixed light intensity adjustment target value to the invisible-light intensity setting unit 440a.

On the other hand, for example, when the invisible-light information 403 or the user is not fixed but the combination of the invisible-light information 403 and user changes, a user is asked to select a light intensity adjustment target value, and the light-intensity adjustment target value selector 441a of the invisible-light source sets the selected light-intensity adjustment target value to the invisible-light intensity setting unit 440a. For example, the light-intensity adjustment target value selector 441a of the invisible-light source stores a plurality of light intensity adjustment target values in a memory or the like, and a user is asked to select one of the stored light intensity adjustment target values through a touch panel, an operation key, or the like. Then, the light-intensity adjustment target value selector 441a of the invisible-light source receives the selected light intensity adjustment target value, which is considered to be suitable for the user.

Figure 13:
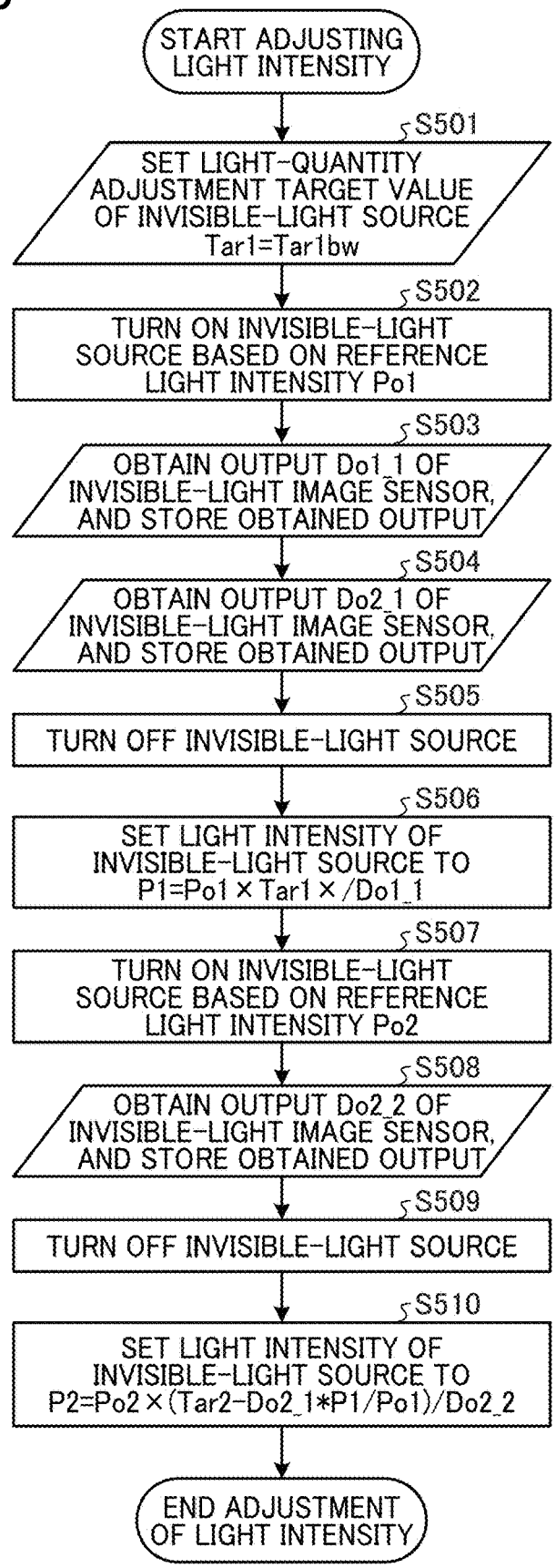
FIG. 13 is a flowchart of light intensity adjustment for a reading device, according to a first modification of the above embodiments of the present disclosure.

FIG. 13 is a flowchart of light intensity adjustment for the reading device 1, according to the first modification of the above embodiments of the present disclosure.

In the flow illustrated in FIG. 13, a step S501 is added before the S101 of the flow illustrated in FIG. 4. In the flow illustrated in FIG. 13, the CPU 31 first sets the light intensity adjustment target value Tar1 of the invisible-light source 43a to the above-described Tar1bw. The following steps in S502 to S510 are equivalent to the steps S101 to S109 in FIG. 4, and apart from the point that Tar1 is replaced with Tar1bw, the light intensity is adjusted under a procedure similar to that of the steps S101 to S109. For the sake of explanatory convenience, a detailed description of the steps in the present modification of the above embodiments of the present disclosure that overlaps with the steps in S502 to S510 is omitted.

FIG. 14A, FIG. 14B1, FIG. 14B2, FIG. B3, FIG. 14C1, FIG. 14C2, and FIG. 14C3 are diagrams to perform comparison between a document to be scanned and an output image output from an image sensor as the document is scanned one time, according to the present modification of the above embodiments of the present disclosure.

FIG. 14A is equivalent to the certificate 400 in FIG. 11A, according to the present modification of the above embodiments of the present disclosure.

As known in the art, the visible-light information includes, for example, a black ballpoint pen or a black dye ink that transmits infrared light. When the visible-light information on the certificate 400 is written with such a black coloring material and standard light intensity adjustment is performed for visible light and invisible light, the radiation intensity of invisible light tends to be adjusted to be stronger or weaker than desired light intensity. When the visible light and invisible light (i.e., infrared light in the present modification of the above embodiments of the present disclosure) are scanned simultaneously under such conditions and when the radiation intensity of invisible light is strong, as illustrated in FIG. 14B1, the text 511 and the image 512 on the visible-light image 510 can be read with almost the same luminosity or brightness as that of the text 401 and the image 402 on the document, i.e., the certificate 400. On the other hand, regarding the invisible-light information 403 on the certificate 400, as illustrated in FIG. 14C1, the difference in luminance or brightness between the background image of the certificate 400 and the image of the invisible-light information 403 is so small that the image of the invisible-light information 403 cannot be visually recognized.

When the radiation intensity of invisible light is small, as illustrated in FIG. 14C2, the difference in luminance or brightness between the background image of the certificate 400 and the image of the invisible-light information 403 is so clear on the invisible-light image 523 that high visual recognizability of the invisible-light image 523 can be achieved. On the other hand, as illustrated in FIG. 14C1, the text 511 and the image 512 on the visible-light image become brighter than the text 401 and the image 402 on the certificate 400, i.e., the document, due to the color mixture caused by invisible light at the visible light sensor, and become difficult to visually recognize.

In order to handle such a situation, the flow of light intensity adjustment is performed. When the flow of light intensity adjustment according to the first modification of the above embodiments of the present disclosure is performed, as illustrated in FIG. 14B3, the influence of color mixture is prevented in the visible-light image 510, and the text 511 and the image 512 are read with luminosity or brightness close to that of the document. In other words, the text 511 and the image 512 are read with luminosity or brightness close to that of the certificate 400. As illustrated in FIG. 14C3, as the light intensity of the invisible-light image 520 is also small, the difference in luminance or brightness between the invisible-light image 523 and the background image of the certificate 400 becomes smaller than that in FIG. 14C2. However, the invisible-light image 523 is read at a visible level.

As described above, for example, when the invisible-light information of the document is a hidden picture or a logo, the scanned image of the invisible-light information needs to be visually recognized by human eyes. If the radiation intensity of light of the invisible-light source is too small, the background image on the document tends to be dark, and the difference in luminance or brightness between the background image and the invisible-light image becomes small. Accordingly, it becomes difficult to recognize the shape of a picture or a logo. For this reason, the required radiation intensity of light of the invisible-light source is determined by the visibility of the invisible-light image. Accordingly, the light intensity adjustment target value can be set by the light-intensity adjustment target value selector 441a of the invisible-light source based on the required radiation intensity of light.

As described above, the light intensity of the invisible-light source is adjusted to a light intensity with which an invisible information can visually be recognized, and the radiation intensity of invisible light is not increased excessively. Due to such a configuration, color mixture in the visible light sensor due to invisible light can be prevented, and the image quality of the visible-light image can be improved.

Second Modification

In a second modification of the above embodiments of the present disclosure, a two-dimensional code data 404 is used as invisible information.

Figure 15:
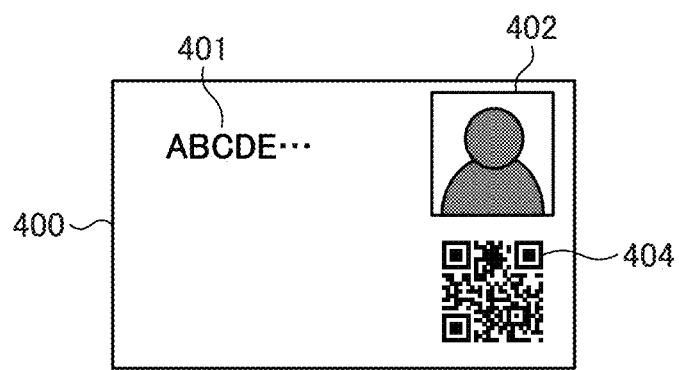
FIG. 15 is a diagram illustrating a certificate in which two-dimensional code data is used as invisible information, according to a second modification of the above embodiments of the present disclosure.

FIG. 15 is a diagram illustrating the certificate 400 in which two-dimensional code data 404 is used as invisible information, according to the present modification of the above embodiments of the present disclosure.

The certificate 400 as illustrated in FIG. 15 includes the two-dimensional code data 404 as invisible information. For example, a quick response (QR) code (registered trademark) is displayed as the two-dimensional code data 404.

The S/N ratio of the image is known as a requirement for the QR code to be decoded. For this reason, the radiation intensity of light of the invisible-light source needs to be equivalent to the light intensity obtained for an image of an S/N ratio with which a QR code can be decoded. As the S/N ratio used for decoding is determined by the cell size of a QR code, a desired radiation intensity of invisible light is determined by the cell size of the QR code, and the light intensity adjustment target value Tar1SN of the invisible-light source is determined.

As described above, the S/N ratio that required for decoding changes depending on the cell size of a QR code. For this reason, the light-intensity adjustment target value selector 441a of the invisible-light source stores a plurality of light intensity adjustment target values for a plurality of cell sizes in a memory or the like, and a user is asked to select the cell size of a QR code through a touch panel, an operation key, or the like. As a result, the cell size is recognized.

If the cell sizes of a QR code to be read is determined by the type of an object such as a certificate, the light-intensity adjustment target value selector 441a of the invisible-light source may recognize such cell sizes based on the type of an object input by a user in view of a table that indicates the relation between the cell size and the type of an object. Such a table that indicates the relation between the cell size of a QR code and the type of an object is stored in a memory or the like. Further, when the QR code to be read is fixed and there is no need to change the cell size, the light intensity adjustment target value of the invisible-light source is determined to be a unique value without going through any setting process. In such cases, in advance, the light-intensity adjustment target value selector 441a of the invisible-light source sets a fixed light intensity adjustment target value that is determined for varying cell size of a QR code to the invisible-light intensity setting unit 440a.

Figure 16:
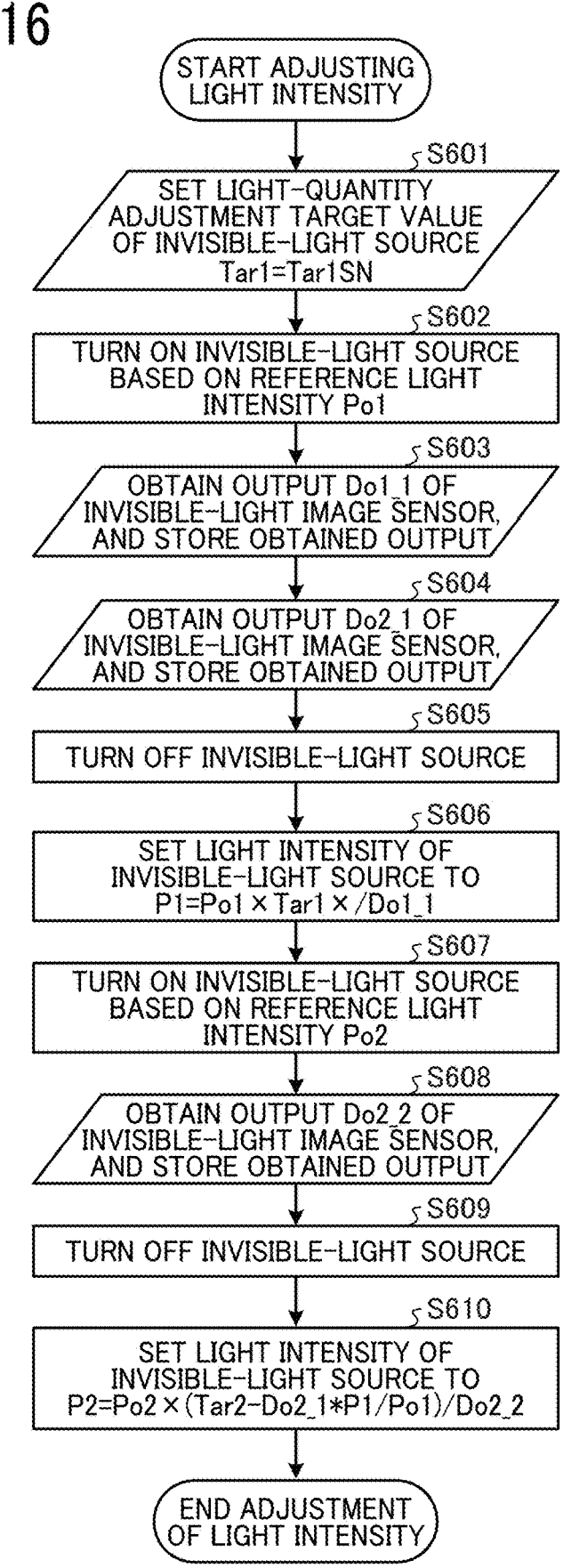
FIG. 16 is a flowchart of light intensity adjustment for a reading device, according to a second modification of the above embodiments of the present disclosure.

FIG. 16 is a flowchart of light intensity adjustment for the reading device 1, according to the second modification of the above embodiments of the present disclosure.

In the flow as depicted in FIG. 16, Tar1bw in the S501 of the flow as depicted in FIG. 13 is replaced with Tar1SN. Apart from the point that Tar1bw is replaced with Tar1SN, in the steps S601 to S610, the light intensity is adjusted under a procedure similar to that of the steps S501 to S510. For the sake of explanatory convenience, a detailed description of the steps in the present modification of the above embodiments of the present disclosure that overlaps with the steps in S501 to S510 is omitted.

As described above, the light intensity adjustment target value Tar1 of the invisible-light source is set to a Tar1SN that satisfies a required S/N ratio. The S/N ratio indicates a condition for decoding a two-dimensional code. Due to such a configuration, the light intensity of the invisible-light source can be adjusted to a light intensity with which an invisible two-dimensional code can be decoded. As the radiation intensity of invisible light is not increased more than necessary, color mixture in the visible light sensor due to invisible light can be prevented, and the image quality of the visible-light image improves.

Third Modification

In a third modification of the above embodiments of the present disclosure, one-dimensional bar code data 405 is used as invisible information.

Figure 17:
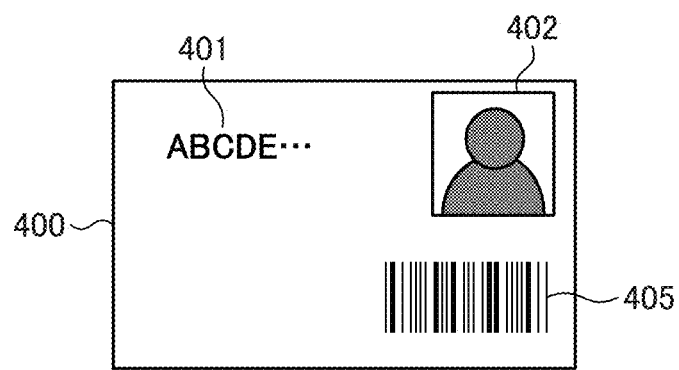
FIG. 17 is a diagram illustrating a certificate in which one-dimensional bar code data is used as invisible information, according to a third modification of the above embodiments of the present disclosure.

FIG. 17 is a diagram illustrating the certificate 400 in which one-dimensional bar code data 405 is used as invisible information, according to the present modification of the above embodiments of the present disclosure.

The certificate 400 as illustrated in FIG. 17 includes the one-dimensional bar code data 405 as invisible information.

The requirement for decoding a one dimensional bar code is a modulation transfer function (MTF) of an image. The MTF is an index that indicates the reading resolution of an image. If the radiation intensity of light of the invisible-light source is too small, the background image of the certificate 400 becomes dark and the MTF decreases. For this reason, at least, a certain level of radiation intensity of the light is required. The MTF that is required for reading a bar code, which is a level at which a bar code can be scanned, is determined by the width of narrow lines of a bar code. Accordingly, the required radiation intensity of invisible light is determined by the width of a narrow line of a bar code, and the light intensity adjustment target value Tar1MTF of the invisible-light source is determined.

The MTF relates to optical image blurring. For this reason, the conditions for the MTF are stricter than the conditions for the difference in luminance or brightness between the background image and the invisible-light image.

As described above, the MTF that is required for reading a bar code changes depending on the width of narrow lines of a bar code. Accordingly, the light-intensity adjustment target value selector 441a of the invisible-light source stores, in a memory or the like, a light intensity adjustment target value for each type of width of narrow lines, and a user is asked to select the width of the narrow lines through a touch panel, an operation key, or the like. By so doing, the width of the narrow lines of the to-be-scanned bar code is recognized.

If the narrow lines of a bar code to be read are determined by the type of an object such as a certificate, the light-intensity adjustment target value selector 441a of the invisible-light source may recognize the widths of such narrow lines of the bar code based on the type of an object input by a user in view of a table that indicates the relation between the type of an object and the widths of narrow lines. Such a table that indicates the relation between the type of an object and the widths of narrow lines of a bar code is stored in a memory or the like. Further, when the widths of narrow lines of a bar code to be read are fixed and there is no need to change the widths of narrow lines, the light intensity adjustment target value of the invisible-light source is determined to be a unique value without going through any setting process. In such cases, in advance, the light-intensity adjustment target value selector 441a of the invisible-light source sets a fixed light intensity adjustment target value that is determined for varying narrow-line width of a bar code to the invisible-light intensity setting unit 440a.

Figure 18:
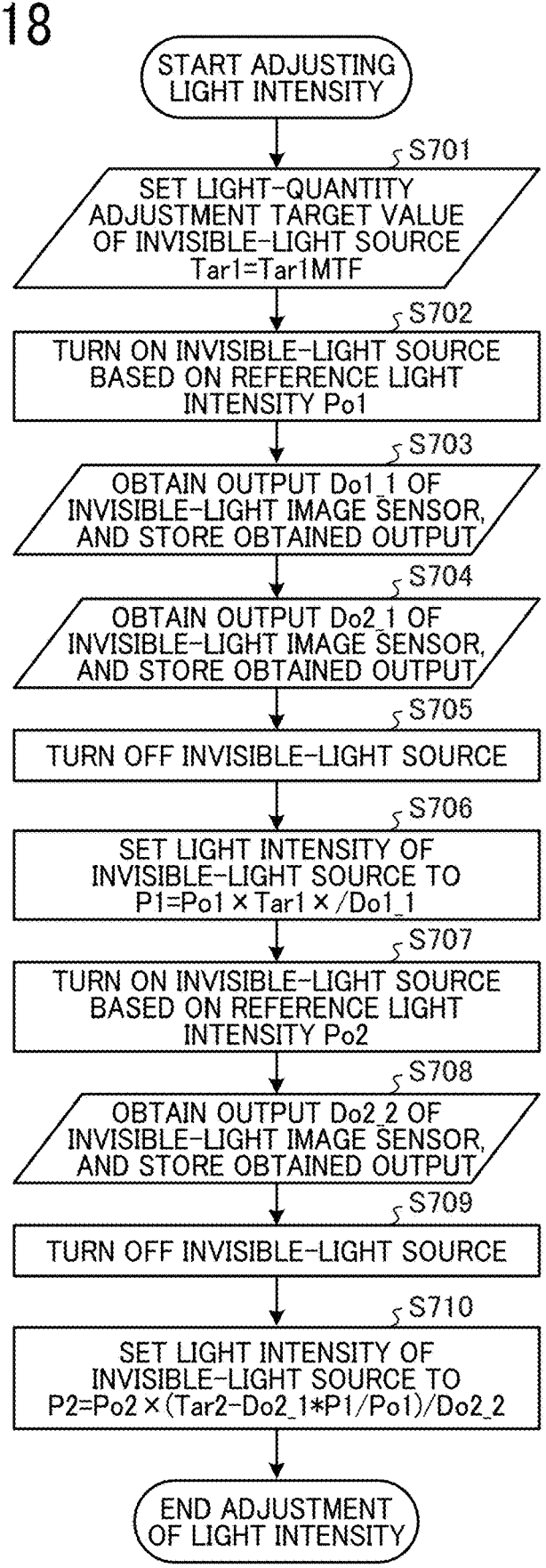
FIG. 18 is a flowchart of light intensity adjustment for a reading device, according to a third modification of the above embodiments of the present disclosure.

FIG. 18 is a flowchart of light intensity adjustment for the reading device 1, according to the third modification of the above embodiments of the present disclosure.

In the flow as depicted in FIG. 18, Tar1bw in the S501 of the flow as depicted in FIG. 13 is replaced with Tar1MTF. Apart from the point that Tar1bw is replaced with Tar1MTF, in the steps S701 to S710, the light intensity is adjusted under a procedure similar to that of the steps S501 to S510. For the sake of explanatory convenience, a detailed description of the steps in the present modification of the above embodiments of the present disclosure that overlaps with the steps in S501 to S510 is omitted.

As described above, the light intensity adjustment target value Tar1 of the invisible-light source is set to a Tar1MTF that satisfies a modulation transfer function (MTF). The MTF indicates a condition for decoding a one-dimensional bar code. Due to such a configuration, the light intensity of the invisible-light source can be adjusted to a light intensity with which an invisible one-dimensional bar code can be decoded. As the radiation intensity of invisible light is not increased more than necessary, color mixture in the visible light sensor due to invisible light can be prevented, and the image quality of the visible-light image improves.

Fourth Modification

Figure 19:
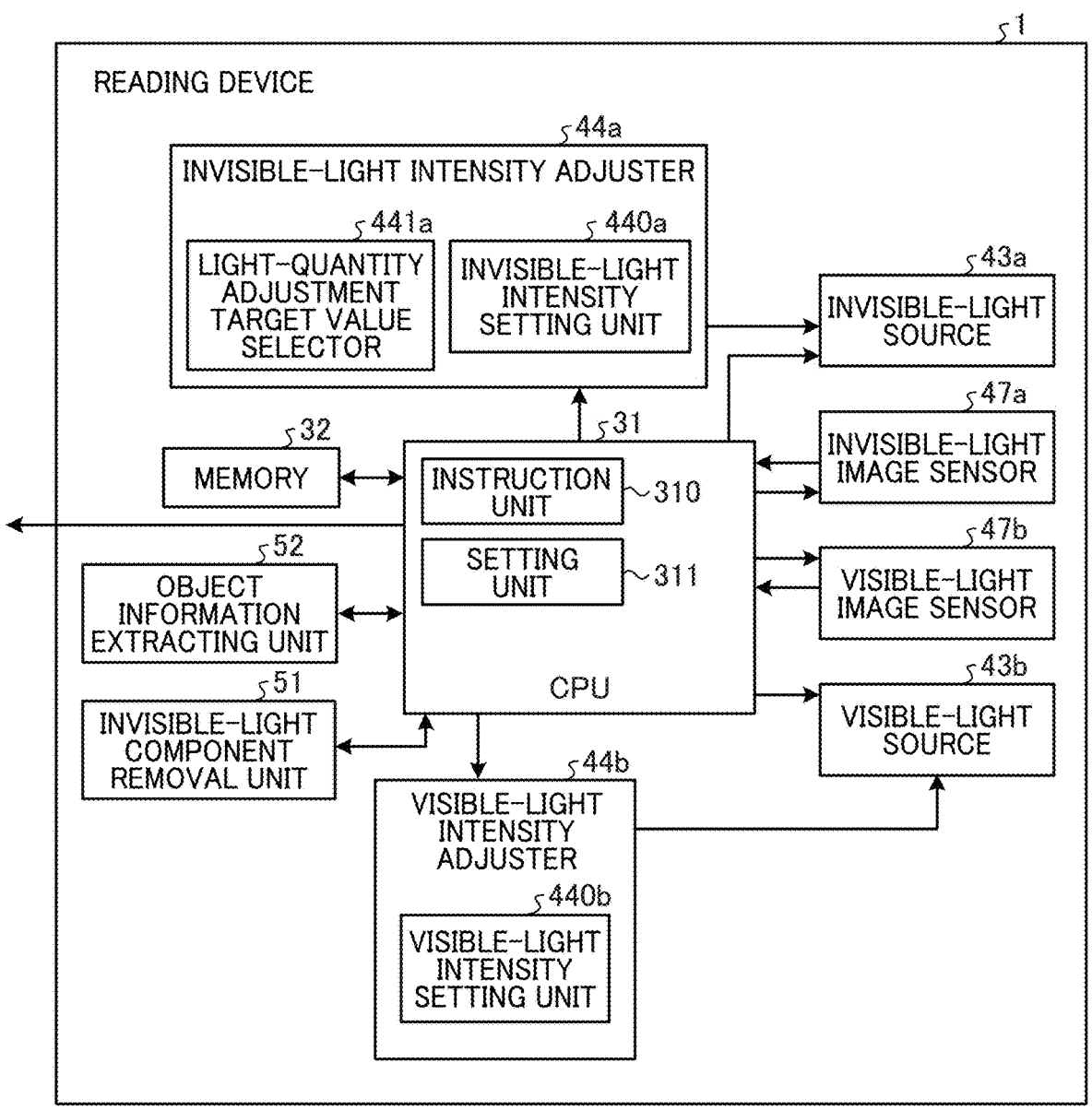
FIG. 19 is a diagram illustrating a configuration of a processing unit that adjusts the intensity of light of a reading device, according to a fourth modification of the above embodiments of the present disclosure.

FIG. 19 is a diagram illustrating a configuration of a processing unit that performs light intensity adjustment for the reading device 1, according to the fourth modification of the above embodiments of the present disclosure.

In addition to the configuration as illustrated in FIG. 12, the reading device 1 as illustrated in FIG. 19 is further provided with an invisible-light component removal unit 51 and an object data extraction unit 52. The invisible-light component removal unit 51 serves as a removal unit.

The invisible-light component removal unit 51 removes the invisible light components from the output from the visible-light image sensor. The invisible-light component removal unit 51 holds the output from the visible-light image sensor when only the invisible-light source is turned on, and subtracts the output from the visible-light image sensor when only the invisible-light source is turned on from the output from the visible-light image sensor when the visible-light source and the invisible-light source are simultaneously turned on. As a result, the invisible light components are removed.

The object data extraction unit 52 extracts object information in the read image. The object information is information indicating whether an object on a read image has an element constituting an image such a feature as a text or character, a feature as a grid of dots, or a feature as a colorless image or colored image. As known in the art, the extracted object information is used to optimize the image processing applied to an image read by a copier or the like. For example, if the object is determined to be a text or character, the edge is enhanced so that the object is clearly visible. If the object is determined to be a pattern, smoothing processes are performed so that the object appears smoothly. If the object has no feature, processes are performed so that the object can be regarded as a background and has a uniform value with the surrounding area.

In the present embodiment, different optical shot noises are on the output from the visible-light image sensor and the output from the invisible-light image sensor, respectively. Accordingly, the noise of the invisible-light image sensor is unintentionally transferred to the output from the visible-light image sensor when the components of the invisible light component are removed. The optical shot noise increases as the light intensity is greater. Accordingly, as the radiation intensity of invisible light is greater, the amount of noise that is transferred when the components of invisible light are removed increases, and the S/N ratio of the visible-light image tends to decrease.

When the S/N ratio decreases and the noise of the visible-light image increases, the extraction of object information is affected. For example, a character portion or a background portion is erroneously determined to be a grid of dots. In order to deal with such a situation, the image from which the components of invisible light have been removed is set to have a light intensity adjustment target value that is a level at which the object information is extractable.

Figure 20:
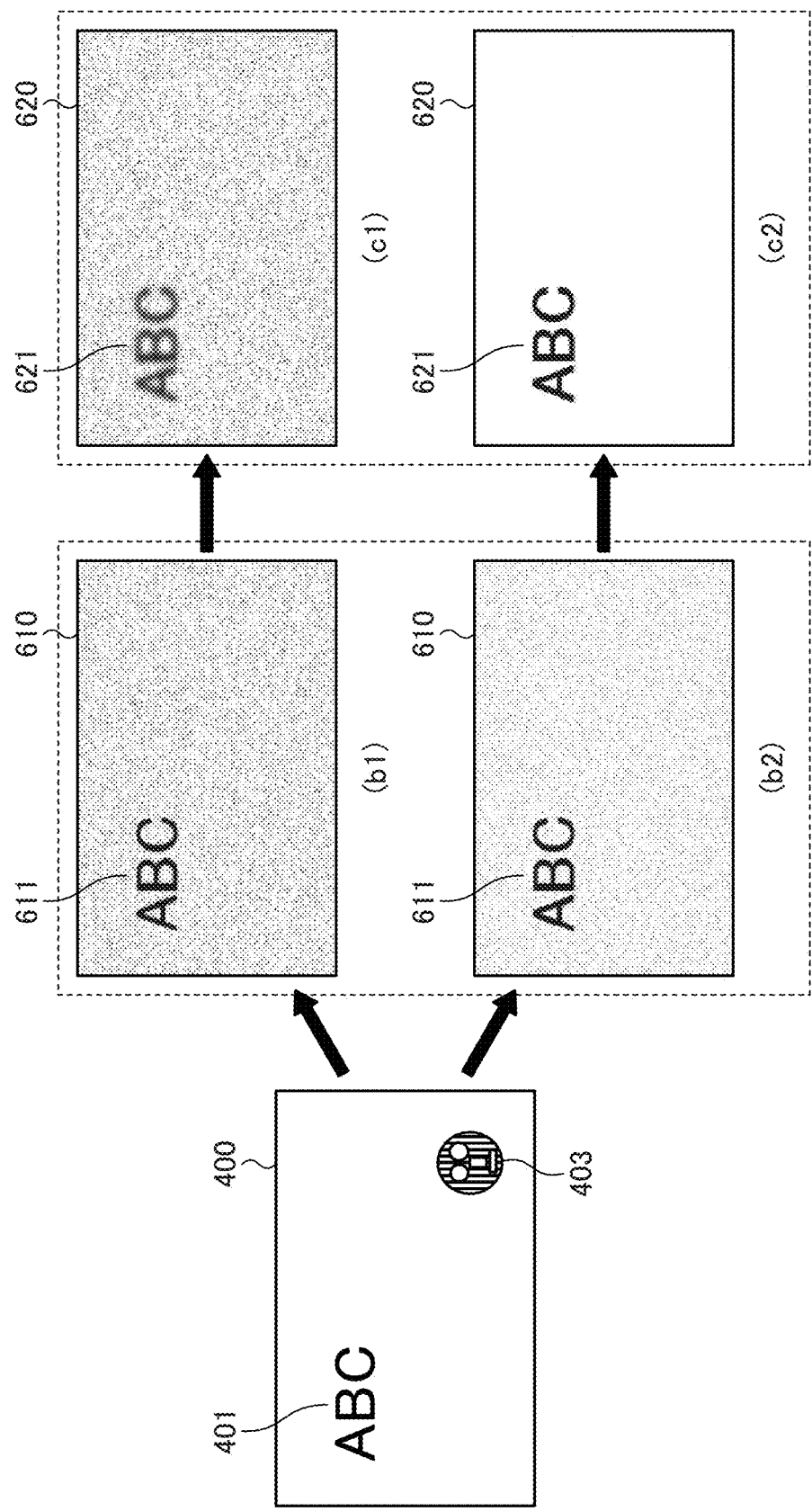
FIG. 20 is a diagram to perform comparison between a document to be scanned and an output image output from an image sensor as the document is scanned one time, according to a fourth modification of the above embodiments of the present disclosure.

FIG. 20 is a diagram to perform comparison between a document to be scanned and an output image output from an image sensor as the document is scanned one time, according to the present modification of the above embodiments of the present disclosure.

As described above, when the S/N ratio decreases and the noise of the visible-light image increases, the extraction of object information is affected. For example, a character portion or a background portion is erroneously determined to be a grid of dots. In such cases, as illustrated in (c1) of FIG. 20, the character portion 621 may be made smooth, or the background portion may be not skipped and a noise image may remain. When such undesired processes take place, the image quality of the output image deteriorates. In order to avoid such a situation, the visible-light image needs to have an S/N ratio equal to or higher than the minimum S/N ratio required to extract object information.

As there is such a relation between the radiation intensity of invisible light and the S/N ratio required for the visible-light image, the upper limit of the invisible-light source light intensity is determined by the S/N ratio of the visible-light image, and the light intensity adjustment target value of the invisible-light source is determined.

If the radiation intensity of invisible light is adjusted so as to obtain the minimum S/N ratio required to extract the object information of the visible-light image, as illustrated in (b2) of FIG. 20, the S/N ratio of the visible-light image can be prevented from decreasing, and the light intensity can be adjusted without erroneous determination in the object information extraction of the visible-light image.

A general-purpose silicon image sensor has sensitivity even in a near infrared range that is approximately from 750 nm to 1100 nm. Accordingly, it is not necessary to prepare special image sensors for visible light and invisible light, and a general-purpose image sensor known in the art may be used.

Figure 21:
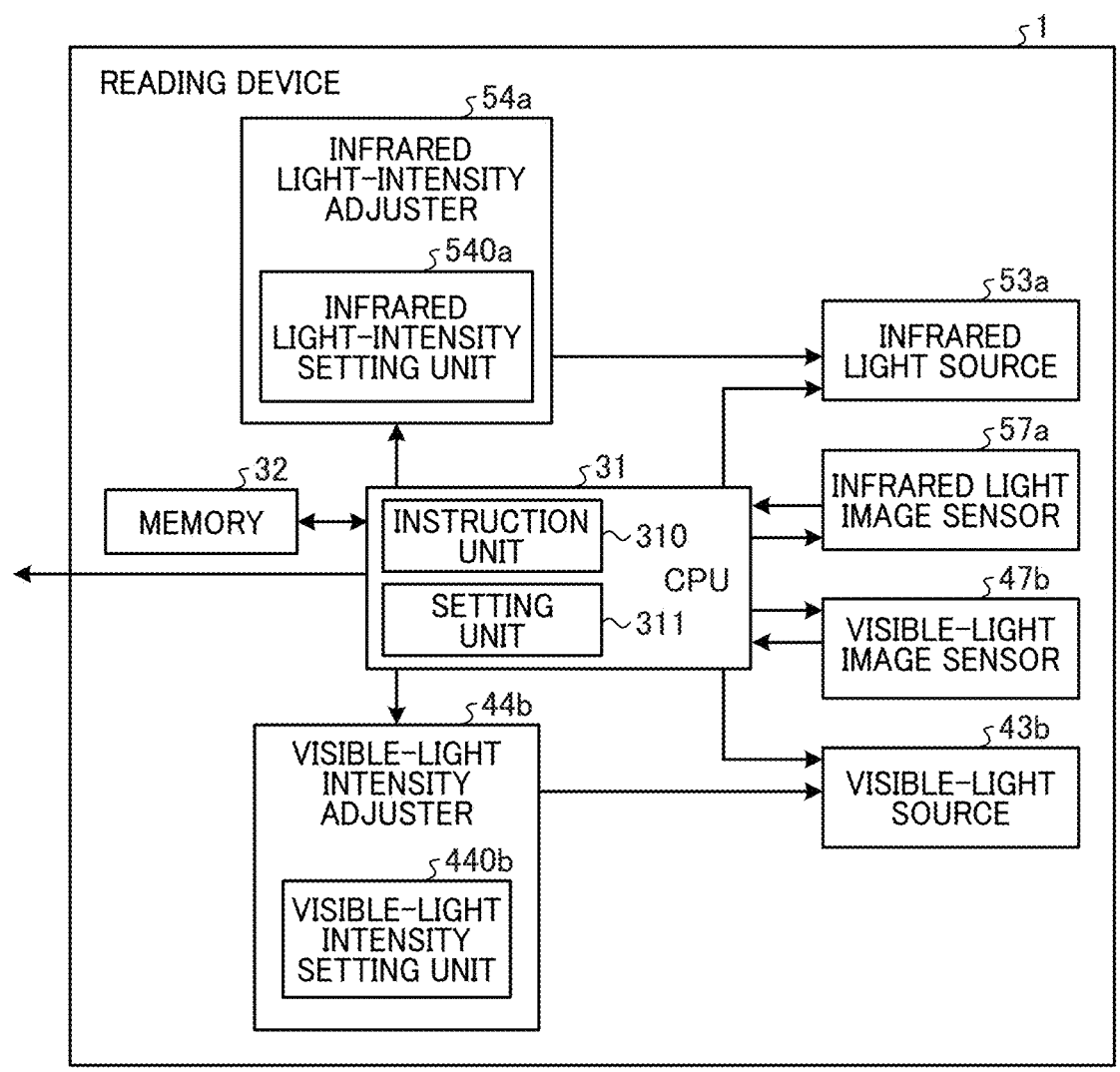
FIG. 21 is a diagram illustrating a configuration of a processing unit that adjusts the intensity of light of a reading device when a general-purpose image sensor is used, according to an alternative embodiment of the present disclosure.

FIG. 21 is a diagram illustrating a configuration of a processing unit that adjusts the intensity of light of the reading device 1 when a general-purpose image sensor is used, according to an alternative embodiment of the present disclosure.

In the configuration illustrated in FIG. 21, the elements that are related to invisible light in the configuration illustrated in FIG. 10 are replaced with elements related to infrared light. The relation between the configuration of FIG. 21 and the configuration of FIG. 10 is as follows.

In FIG. 21, the invisible-light source 43*a* (see FIG. 10) is replaced with an infrared light source 53*a*. In accordance with such replacement, the invisible-light intensity adjuster 44*a* (see FIG. 10) is replaced with an infrared light-intensity adjuster 54*a*, and the invisible-light intensity setting unit 440*a* (see FIG. 10) is replaced with the infrared light intensity setting unit 540*a*. Moreover, the invisible-light image sensor 47*a* (see FIG. 10) is replaced with the infrared light image sensor 57*a*.

In the present embodiment, a general-purpose silicon image sensor is used for the visible-light image sensor 47*b* and the infrared light image sensor 57*a*.

Figure 22:
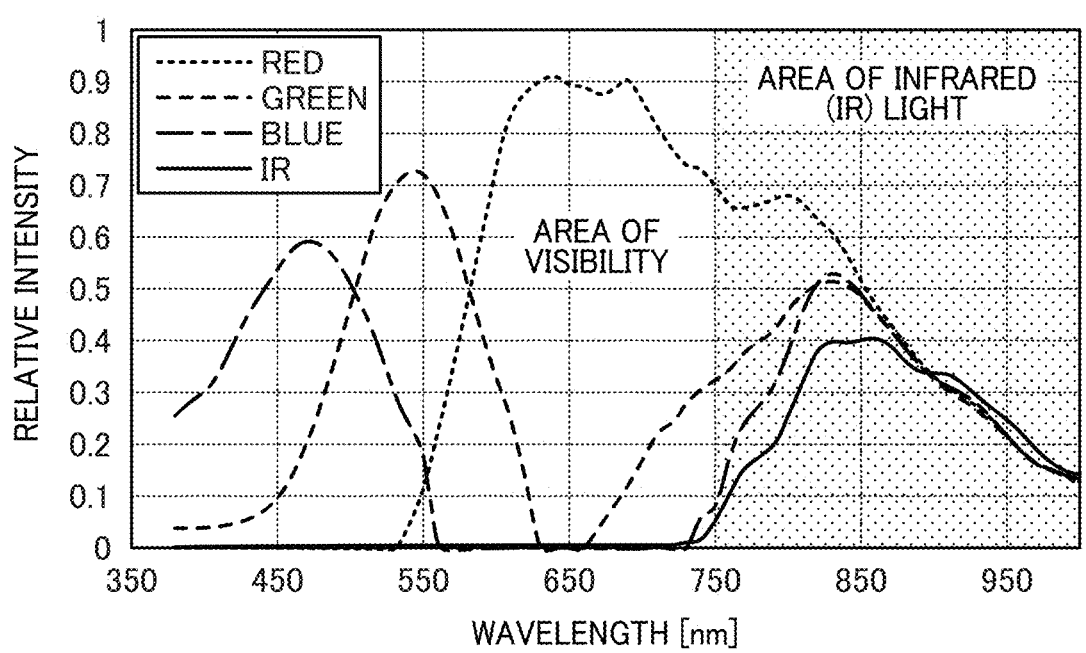
FIG. 22 is a diagram illustrating the spectral characteristics of a silicon image sensor, according to an alternative embodiment of the present disclosure.

FIG. 22 is a diagram illustrating the spectral characteristics of a silicon image sensor, according to an alternative embodiment of the present disclosure.

FIG. 22 is a graph illustrating the photosensitivity characteristics in each wavelength range, where the horizontal axis indicates the wavelength "nm" and the vertical axis indicates the relative intensity, according to an alternative embodiment of the present disclosure.

As illustrated in FIG. 22, each of the lights of colors including red, green, and blue has high sensitivity in the wavelength range of each color. In a similar manner, infrared (IR) light has high sensitivity in the wavelength range of infrared light.

If such a silicon image sensor is used, a filter 171 that blocks visible light is arranged in a range of pixels for reading invisible light, and a relatively simple configuration can be achieved.

In the above embodiments of the present disclosure and the modifications of the above embodiments of the present disclosure, as illustrated in FIG. 3, the reflection light of the light that is emitted from the first light source 13*a* is incident on the first image sensor 17*a*, and the reflection light of the light that is emitted from the second light source 13*b* is incident on the second image sensor 17*b*. However, no limitation is indicated thereby, and any known reference object provided for the reading device 1 may reflect the light from the first light source 13*a* and the light from the second light source 13*b* to the first image sensor 17*a* and the second image sensor 17*b*.

Figure 23:
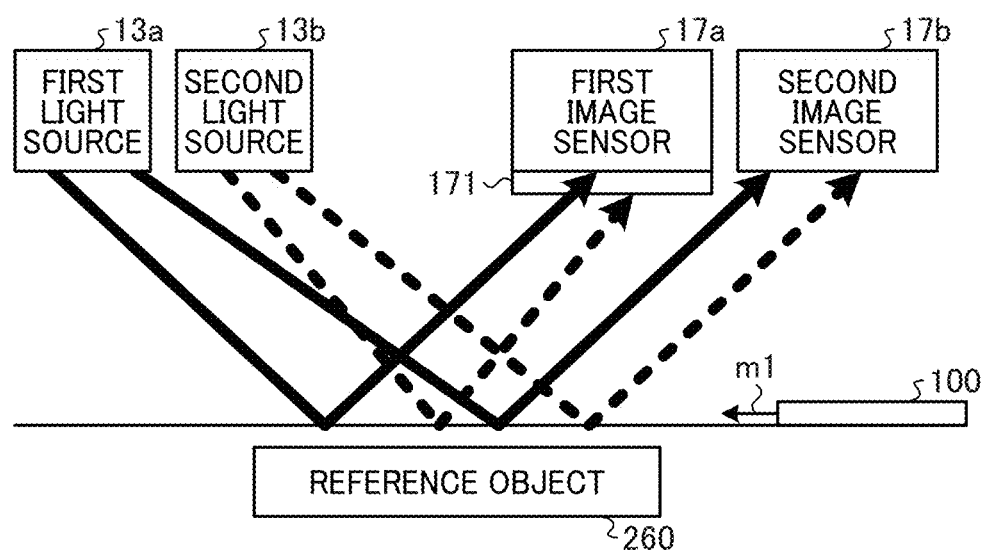
FIG. 23 is a diagram illustrating a configuration in which the lights emitted from a pair of light sources are reflected by a reference object toward a pair of image sensors, according to an alternative embodiment of the present disclosure.

FIG. 23 is a diagram illustrating a configuration in which the lights emitted from a pair of light sources are reflected by a reference object 260 toward a pair of image sensors, according to an alternative embodiment of the present disclosure.

As illustrated in FIG. 23, in the present alternative embodiment of the present disclosure, the reference object 260 provided for the reading device 1 reflects the light from the first light source 13*a* and the light from the second light source 13*b* to the first image sensor 17*a* and the second image sensor 17*b*. The reference object 260 may be, for example, a white reference member. Due to such a configuration in which a known reference object provided for the reading device 1 is adopted as described above, data can be acquired with high stability, and the accuracy of light intensity adjustment can further be improved.

Second Embodiment

Figure 24:
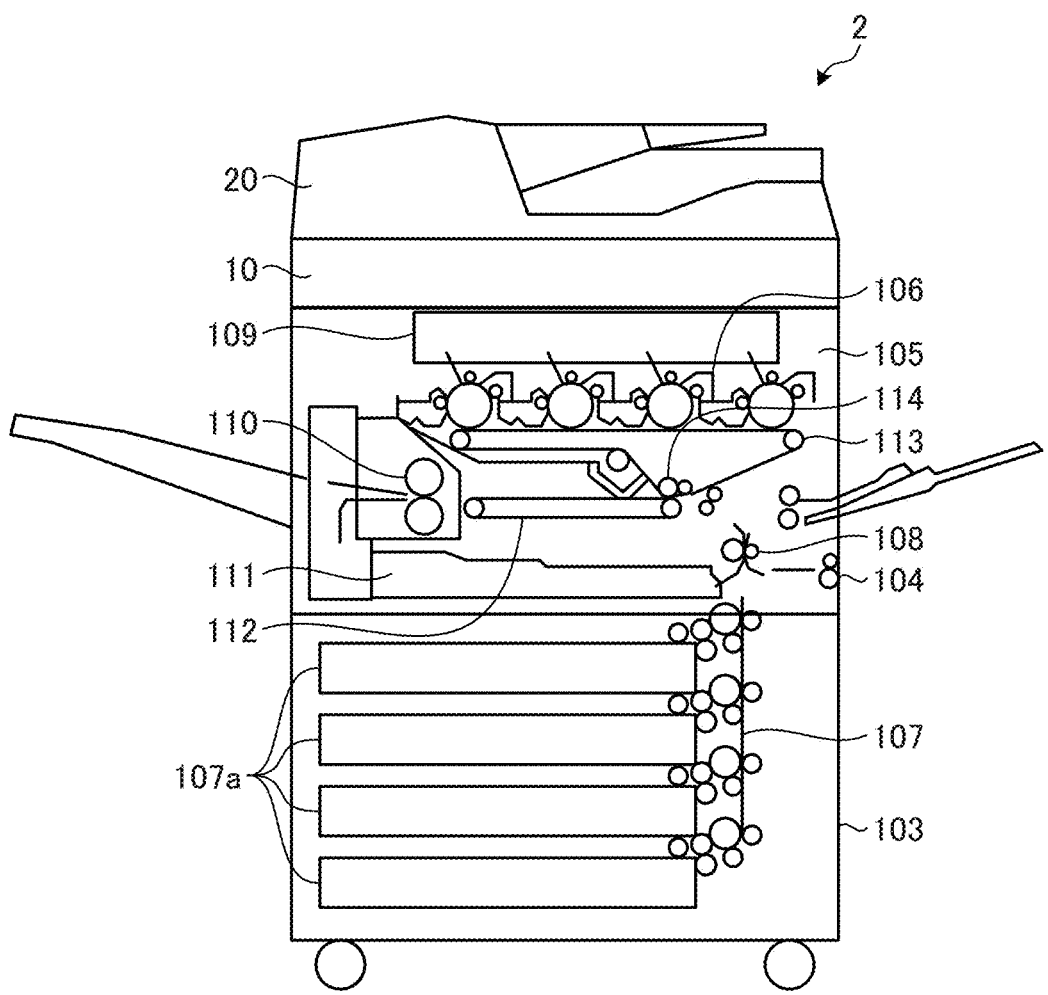
FIG. 24 is a diagram illustrating a configuration or structure of an image forming apparatus according to a second embodiment of the present disclosure.

FIG. 24 is a diagram illustrating a configuration or structure of an image forming apparatus 2 according to a second embodiment of the present disclosure.

The image forming apparatus 2 as illustrated in FIG. 24 has at least two of a photocopying function, a printing function, a scanning function, and a facsimile (FAX) function, and is referred to as a multifunction printer or multifunction peripheral (MFP) in general.

The image forming apparatus 2 is provided with an reading device main body 10 and an automatic document feeder (ADF) 20 that together serve as an image reading device, and is further provided with an image forming device 103 on the downside.

In the ADF 20, a document is fed, a surface to be read is read at a scanning position or scanning window, and the document is ejected to an output tray. The reading device main body 10 reads the surface to be read of the document at the scanning position. The ADF 20 according to the present embodiment is equivalent to the ADF 20 according to the first embodiment (see FIG. 1), and the reading device main body 10 according to the present embodiment is equipment to the reading device main body 10 according to the first embodiment (see FIG. 1). As the ADF 20 and the reading device main body 10 have already been described in the first embodiment, further description of the ADF 20 and the reading device main body 10 is omitted.

In FIG. 24, an external cover of the image forming device 103 is detached to illustrate the inner structure. The image forming device 103 prints a document image scanned and read by the reading device main body 10. The image forming device 103 is provided with a manual feeding roller 104 through which a recording sheet is manually fed and a recording sheet supply unit 107 that supplies a recording sheet. In the present embodiment, the recording sheet is an example of a recording medium. The recording sheet supply unit 107 has mechanisms to feed a recording sheet from a plurality of sheet trays 107*a* at multiple levels. The fed recording sheet is conveyed to a secondary transfer belt 112 through a registration roller pair 108.

A toner image on the intermediate transfer belt 113 is transferred by a transfer unit 114 onto a recording sheet that is conveyed on the secondary transfer belt 112.

Moreover, the image forming device 103 includes, for example, an optical writing device 109, an image forming unit (Y, M, C, and K) 105 of tandem system, the intermediate transfer belt 113, and the secondary transfer belt 112 as described above. In the image forming processes performed by the image forming unit 105, the first image or second image that is drawn by the optical writing device 109 is formed on the intermediate transfer belt 113 as a toner image.

More specifically, the image forming unit (Y, M, C, and K) 105 includes four photoconductor drums (Y, M, C, and K) in a rotatable manner, and an image forming element 106 that includes a charging roller, a development device, a primary transfer roller, a cleaner unit, and a discharger is disposed around each one of the four photoconductor drums. As the image forming element 106 operates on each photoconductor drum, the image on the photoconductor drum is transferred onto the intermediate transfer belt 113 by each primary transfer roller.

The intermediate transfer belt 113 is arranged as extended by a drive roller and at least one driven roller at the nip between the multiple photoconductor drums and the multiple primary transfer rollers. As intermediate transfer belt 113 runs, the secondary transfer device secondarily transfers the toner image, which is transferred onto the intermediate transfer belt 113 in the primary transfer process, onto the recording sheet that is being conveyed on the secondary transfer belt 112. As the secondary transfer belt 112 runs, the recording paper is conveyed to the fixing device 110, and the toner image is fixed on the recording sheet as a color image. After that, the recording sheet is ejected to an external output tray. When duplex printing is to be performed, the front and back sides of the recording sheet is turned by a turning mechanism 111, and the turned recording sheet is conveyed onto the secondary transfer belt 112.

The image forming device 103 is not limited to the one that forms an image by an electrophotographic method as described above. The image forming device 103 may be one that forms an image by an inkjet method.

In the above description, preferred embodiments of the present disclosure and the modifications of those embodiments of the present disclosure are described. However, the description of the above embodiments and the modifications of those embodiments is given by way of example, and no limitation is intended thereby. Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims. In addition, the embodiments and modifications or variations thereof are included in the scope and the gist of the invention, and are included in the invention described in the claims and the equivalent scopes thereof.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Further, as described above, any one of the above-described and other methods of the present disclosure may be embodied in the form of a computer program stored on any kind of storage medium. Examples of storage media include, but are not limited to, flexible disks, hard disks, optical discs, magneto-optical discs, magnetic tape, nonvolatile memory cards, read only memory (ROM), etc. Alternatively, any one of the above-described and other methods of the present disclosure may be implemented by application-specific integrated circuits (ASICs), prepared by interconnecting an appropriate network of conventional component circuits, or by a combination thereof with one or more conventional general-purpose microprocessors and/or signal processors programmed accordingly.

What is claimed is:

1. A reading device comprising:
a first light source configured to emit light;
a second light source configured to emit light in a wavelength of light different from a wavelength of light of the first light source;
circuitry configured to instruct the first light source and the second light source to turn on and turn off;
a first light-intensity adjuster configured to adjust light intensity of the first light source based on a first light intensity value;
a second light-intensity adjuster configured to adjust light intensity of the second light source based on a second light intensity value;
a first image sensor configured to receive the light that is emitted from the first light source and is reflected by an object; and
a second image sensor configured to receive the light that is emitted from the first light source and the second light source and is reflected by the object,
the circuitry being configured to set a light intensity value that satisfies a first light intensity condition as the first light intensity value, based on data output from the first image sensor while the first light source is turned on, the circuitry being configured to set a light intensity value that satisfies a second light intensity condition as the second light intensity value, based on data output from the second image sensor while the first light source is turned on.

2. The reading device according to claim 1, further comprising
a memory,
wherein the circuitry is configured to
store, in the memory, output data output from the first image sensor and output data output from the second image sensor when the first light source is turned on,
set, as the first light intensity value, a light intensity value calculated from the first light intensity condition, based on the output data output from the first image sensor,
release an area of the memory in which the output data output from the first image sensor is stored to store the output data output from the second image sensor when the second light source is turned on, and
set, as the second light intensity value, a light intensity value calculated from the second light intensity condition based on the output data output from the second image sensor when the first light source is turned on and the output data output from the second image sensor when the second light source is turned on.

3. The reading device according to claim 1, wherein the circuitry is configured to set the first light intensity value while the first light source is turned on, and wherein the circuitry is configured to set the second light intensity value while the second light source is turned on.

4. The reading device according to claim 3, wherein the circuitry is configured to set the second light intensity value while the first light source is turned on, based on light intensity set as the first light intensity value.

5. The reading device according to claim 1, wherein the circuitry is configured to set the second light intensity value within a range of light intensity in which an image is not saturated in the second image sensor.

6. The reading device according to claim 1, wherein the second light source is configured to emit light in a wavelength range of visible light, and wherein the first light source is configured to emit light in a wavelength range of invisible light different from the wavelength range of the visible light.

7. The reading device according to claim 6, further comprising a selector configured to receive a visually-recognizable level at which a scanned image in the wavelength range of invisible light is visually recognizable, the visually-recognizable level being output from the first image sensor, wherein the circuitry is configured to set, as the first light intensity value, a light intensity value satisfying a light intensity adjustment target value indicated by the visually-recognizable level received by the selector.

8. The reading device according to claim 6, further comprising a selector configured to receive a decodable level at which a two-dimensional code in the wavelength range of invisible light is decoded, the decodable level being output from the first image sensor, wherein the circuitry is configured to set, as the first light intensity value, a light intensity value satisfying a light intensity adjustment target value indicated by the decodable level received by the selector.

9. The reading device according to claim 6, further comprising a selector configured to receive a barcode-readable level at which a bar code in the wavelength range of invisible light is readable, the barcode-readable level being output from the first image sensor, wherein the circuitry is configured to set, as the first light intensity value, a light intensity value satisfying a light intensity adjustment target value indicated by the barcode-readable level received by the selector.

10. The reading device according to claim 7, wherein the circuitry is configured to remove a component of the light emitted from the first light source from an output image output from the second image sensor, wherein the circuitry is configured to extract object information from the output image, and wherein the circuitry is configured to set a light intensity value of the first light source to an extractable level at which the object information is extractable from an image from which the component of the light has been removed by the circuitry.

11. The reading device according to claim 6, wherein the first light source is a light source configured to emit light in a wavelength range of infrared light.

12. The reading device according to claim 1, wherein the first image sensor and the second image sensor are configured to receive the light that is emitted from the first light source and the second light source and is reflected by a reference object to adjust light intensity of the first light source and the second light source.

13. The reading device according to claim 1, further comprising an avoidance unit configured to prevent the light that is emitted from the second light source and is reflected by the object from being incident on the first image sensor.

14. An image forming apparatus comprising:
the reading device according to claim 1; and
an image forming device configured to form an output image output from at least one of the first image sensor and the second image sensor on a recording medium, the output image being read from the object while the circuitry performs light-intensity setting.

15. A method of preventing color mixture between a first image sensor and a second image sensor, the method comprising:

setting a light intensity value that satisfies a first light intensity condition as a first light intensity value based on data output from the first image sensor while a first light source is turned on;

setting a light intensity value that satisfies a second light intensity condition as a second light intensity value based on data output from the second image sensor while the first light source is turned on;

adjusting light intensity of the first light source based on the first light intensity value; and adjusting light intensity of a second light source based on the second light intensity value.

* * * * *